United States Patent
Verduci et al.

(10) Patent No.: US 7,066,523 B2
(45) Date of Patent: Jun. 27, 2006

(54) TONNEAU COVER FOR AUTOMOTIVE VEHICLE

(75) Inventors: Anthony J. Verduci, Milford, MI (US); Brian W. Staley, Bloomfield, MI (US); Abdullah Dagcevizi, Bush Hill Park (GB); Adrian N. Montanaro, Holland, OH (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 10/868,750

(22) Filed: Jun. 14, 2004

(65) Prior Publication Data
US 2005/0029832 A1 Feb. 10, 2005

Related U.S. Application Data

(60) Provisional application No. 60/477,724, filed on Jun. 11, 2003.

(51) Int. Cl.
*B60P 7/02* (2006.01)

(52) U.S. Cl. ............... 296/100.06; 296/100.07

(58) Field of Classification Search ........... 296/100.06, 296/100.07, 100.02, 216.09, 220.01
See application file for complete search history.

(56) References Cited

U.S. PATENT DOCUMENTS

| | | | |
|---|---|---|---|
| 1,495,820 A | 5/1924 | Tierney |
| 1,603,379 A | 10/1926 | Dautrick |
| 1,740,827 A | 12/1929 | Mayea |
| 2,068,732 A | 1/1937 | Cadwallader |
| 2,172,169 A | 9/1939 | Claud-Mantle |
| 2,285,301 A | 6/1942 | Nelson |
| 2,831,718 A | 4/1958 | Hallek et al. |
| 2,901,286 A | 8/1959 | Harris |
| 2,916,317 A | 12/1959 | Diday |
| 3,106,422 A | 10/1963 | White |
| 3,374,021 A | 3/1968 | Gulette |
| 3,489,456 A | 1/1970 | Klanke |
| 3,578,378 A | 5/1971 | Anderson |
| 3,640,565 A | 2/1972 | Anderson |
| 3,704,039 A | 11/1972 | Dean |
| 3,762,763 A | 10/1973 | Deshores |
| 3,803,766 A | 4/1974 | Mesnel |
| 3,894,767 A | 7/1975 | Schatzler et al. |
| 3,923,334 A | 12/1975 | Key |
| 4,068,886 A | 1/1978 | Gostomski |
| 4,143,497 A | 3/1979 | Offenbacher |

(Continued)

FOREIGN PATENT DOCUMENTS

DE 40 13 157 7/1991

(Continued)

*Primary Examiner*—Dennis H. Pedder
(74) *Attorney, Agent, or Firm*—Harness, Dickey & Pierce, P.L.C.

(57) ABSTRACT

A tonneau cover employs a plurality of independently operable panels that extend across the truck bed and are arranged so that the tailgate can be moved between open and closed positions regardless of the positions of the panels. Latch assemblies employ an initiator such that when operated to unlatch the panel, the initiator encourages movement of the panel to an ajar position. The panels are connected by a hinge assembly that includes a biased prop that automatically engages to hold the panel in an open position. There are two different pairs of mounting assemblies wherein a first pair includes two latching surfaces and one mounting location and the other pair includes one latching surface and two mounting locations. A two-way operable seal is employed between adjacent panels to seal the panels regardless of the sequence in which the two adjacent panels are closed.

27 Claims, 18 Drawing Sheets

U.S. PATENT DOCUMENTS

| | | |
|---|---|---|
| 4,199,188 A | 4/1980 | Albrecht et al. |
| 4,308,302 A | 12/1981 | Etter et al. |
| 4,348,443 A | 9/1982 | Hein |
| 4,513,044 A | 4/1985 | Shigeki et al. |
| 4,522,440 A | 6/1985 | Gostomski |
| 4,531,775 A | 7/1985 | Beals |
| 4,542,610 A | 9/1985 | Weimar |
| 4,615,557 A | 10/1986 | Robinson |
| 4,745,016 A * | 5/1988 | Hashimoto et al. .......... 428/122 |
| 4,762,360 A * | 8/1988 | Huber ................... 296/100.07 |
| 4,773,126 A | 9/1988 | Voss |
| 4,779,907 A | 10/1988 | Yu |
| 4,784,414 A | 11/1988 | Free |
| 4,789,197 A | 12/1988 | Lewis |
| 4,807,921 A | 2/1989 | Champie, III et al. |
| 4,813,735 A | 3/1989 | Avitable |
| 4,824,162 A | 4/1989 | Geisler et al. |
| 4,832,394 A | 5/1989 | Macomber |
| 4,863,208 A | 9/1989 | Streett |
| 4,909,561 A | 3/1990 | Lovaas |
| 4,943,194 A | 7/1990 | Aguilar |
| 5,067,766 A | 11/1991 | Lovaas |
| 5,141,265 A | 8/1992 | Claar et al. |
| 5,150,542 A | 9/1992 | Hannya et al. |
| 5,183,309 A | 2/1993 | Jordan |
| 5,183,310 A | 2/1993 | Shaughnessy |
| 5,316,357 A | 5/1994 | Schroeder |
| 5,350,213 A | 9/1994 | Bernardo |
| 5,462,292 A | 10/1995 | Yamane |
| 5,503,450 A | 4/1996 | Miller |
| 5,564,773 A | 10/1996 | Lapsley et al. |
| 5,593,192 A | 1/1997 | Stuchinsky |
| 5,622,008 A | 4/1997 | King |
| 5,632,522 A | 5/1997 | Gaitan et al. |
| 5,636,893 A | 6/1997 | Wheatley et al. |
| 5,715,632 A | 2/1998 | Nozaki |
| 5,727,839 A | 3/1998 | Rühringer et al. |
| 5,857,729 A | 1/1999 | Bogard |
| 5,882,058 A | 3/1999 | Karrer |
| 5,904,393 A | 5/1999 | Yoder |
| 5,918,421 A | 7/1999 | Nozaki |
| 5,950,366 A | 9/1999 | Uhlmeyer |
| 5,954,382 A | 9/1999 | Combs |
| 5,971,446 A | 10/1999 | Lunney, II |
| 5,988,728 A | 11/1999 | Lund et al. |
| 6,000,744 A | 12/1999 | Kooiker |
| 6,042,173 A | 3/2000 | Nett |
| 6,053,557 A | 4/2000 | Kooiker |
| 6,076,881 A | 6/2000 | Tucker |
| 6,082,806 A | 7/2000 | Bogard |
| 6,095,587 A | 8/2000 | Shirlee et al. |
| 6,129,407 A | 10/2000 | Kooiker |
| 6,149,220 A | 11/2000 | Weldy et al. |
| 6,170,900 B1 | 1/2001 | Kooiker |
| 6,174,005 B1 | 1/2001 | Norton |
| 6,183,035 B1 | 2/2001 | Rusu et al. |
| 6,217,102 B1 | 4/2001 | Lathers |
| 6,224,140 B1 | 5/2001 | Hoplock |
| 6,227,602 B1 | 5/2001 | Bogard |
| 6,234,560 B1 | 5/2001 | Hunt |
| 6,247,271 B1 | 6/2001 | Fioritto et al. |
| 6,254,169 B1 | 7/2001 | Arthur |
| 6,264,266 B1 | 7/2001 | Rusu et al. |
| 6,299,232 B1 | 10/2001 | Davis |
| 6,309,005 B1 | 10/2001 | Priest et al. |
| 6,322,128 B1 | 11/2001 | Karrer |
| 6,332,645 B1 | 12/2001 | Schwarz |
| 6,338,520 B1 | 1/2002 | Rusu et al. |
| 6,343,828 B1 | 2/2002 | Young et al. |
| 6,352,296 B1 | 3/2002 | Kooiker |
| 6,382,698 B1 | 5/2002 | Harrell |
| 6,382,700 B1 | 5/2002 | Young et al. |
| 6,386,619 B1 | 5/2002 | Tsuchida |
| 6,393,766 B1 | 5/2002 | Nozaki et al. |
| 6,419,308 B1 | 7/2002 | Corder et al. |
| 6,427,500 B1 | 8/2002 | Weinerman et al. |
| 6,435,597 B1 | 8/2002 | Anders et al. |
| 6,447,045 B1 | 9/2002 | Dickson et al. |
| 6,485,094 B1 | 11/2002 | Corder et al. |
| 6,487,820 B1 | 12/2002 | Nakajima et al. |
| 6,497,445 B1 | 12/2002 | Combs, II |
| 6,497,447 B1 | 12/2002 | Willard |
| 6,520,559 B1 | 2/2003 | Steffens et al. |
| 6,527,330 B1 | 3/2003 | Steffens et al. |
| 6,530,618 B1 | 3/2003 | Nozaki et al. |
| 6,533,343 B1 | 3/2003 | Bohm et al. |
| 6,536,833 B1 | 3/2003 | Nozaki |
| 6,539,671 B1 | 4/2003 | Yamaguchi et al. |
| 6,547,310 B1 | 4/2003 | Myers |
| 6,550,852 B1 * | 4/2003 | Patz et al. ................... 296/211 |
| 6,565,141 B1 | 5/2003 | Steffens et al. |
| 6,712,418 B1 * | 3/2004 | Lathers ................... 296/100.02 |
| 2001/0027622 A1 | 10/2001 | Mine et al. |
| 2001/0035664 A1 | 11/2001 | Steffens et al. |
| 2001/0050494 A1 | 12/2001 | Rusu et al. |
| 2001/0054261 A1 | 12/2001 | Nozaki et al. |
| 2002/0053811 A1 | 5/2002 | Myers |
| 2002/0063438 A1 | 5/2002 | Rusu |
| 2002/0109371 A1 | 8/2002 | Wheatley |
| 2002/0129558 A1 | 9/2002 | Baba et al. |
| 2002/0178656 A1 | 12/2002 | Nozaki et al. |
| 2003/0019160 A1 | 1/2003 | Oda et al. |
| 2003/0051411 A1 | 3/2003 | Nozaki et al. |
| 2003/0107234 A1 | 6/2003 | Votruba et al. |
| 2004/0169393 A1 * | 9/2004 | Henderson ............. 296/100.06 |
| 2004/0245799 A1 * | 12/2004 | Rusu ..................... 296/100.06 |

FOREIGN PATENT DOCUMENTS

| | | |
|---|---|---|
| DE | 40 13 158 | 9/1991 |
| DE | 195 32 276 | 4/1997 |
| EP | 0 303 386 | 7/1989 |
| FR | 2 727 069 | 11/1994 |
| WO | WO 98/05530 | 2/1998 |

* cited by examiner

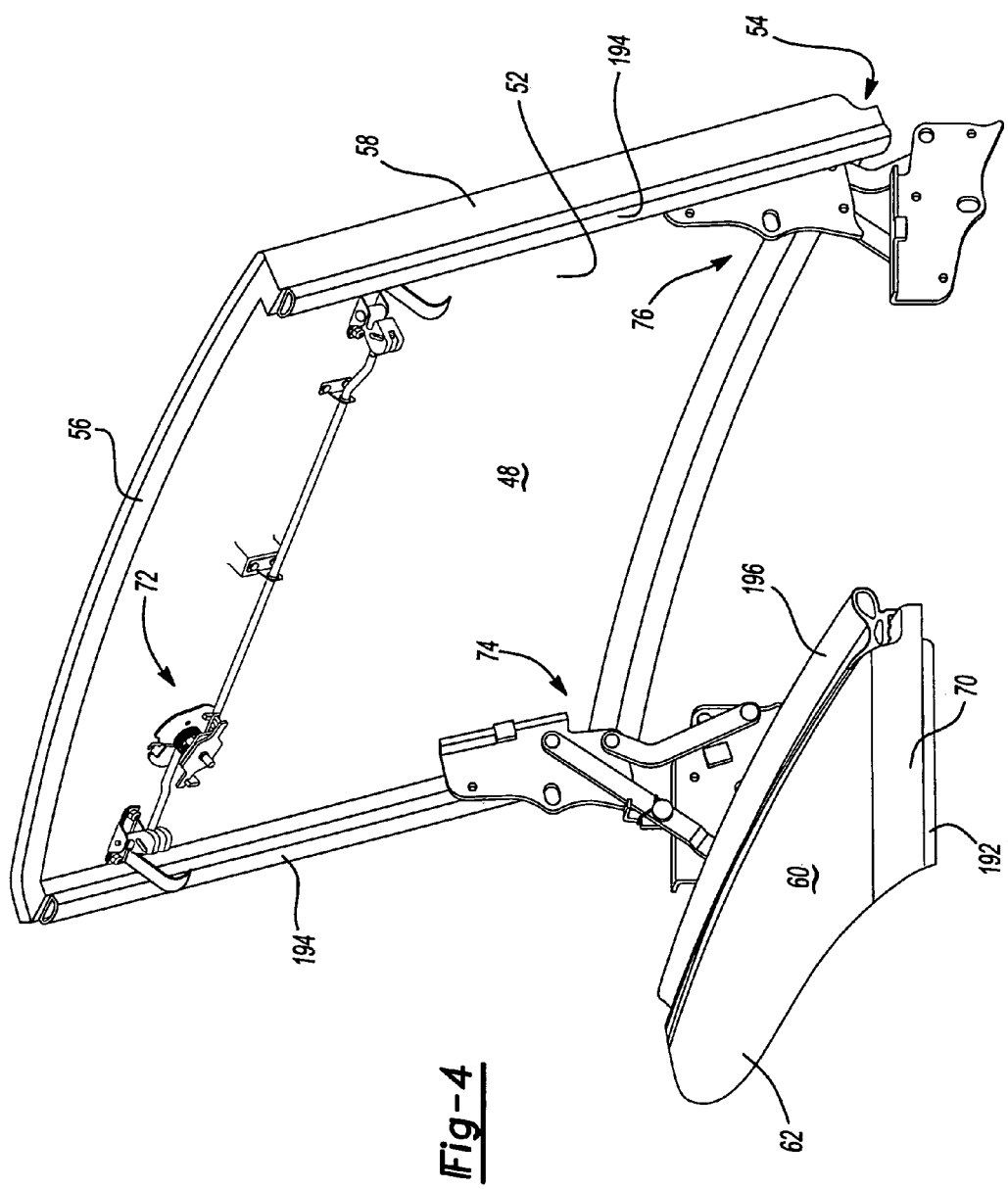

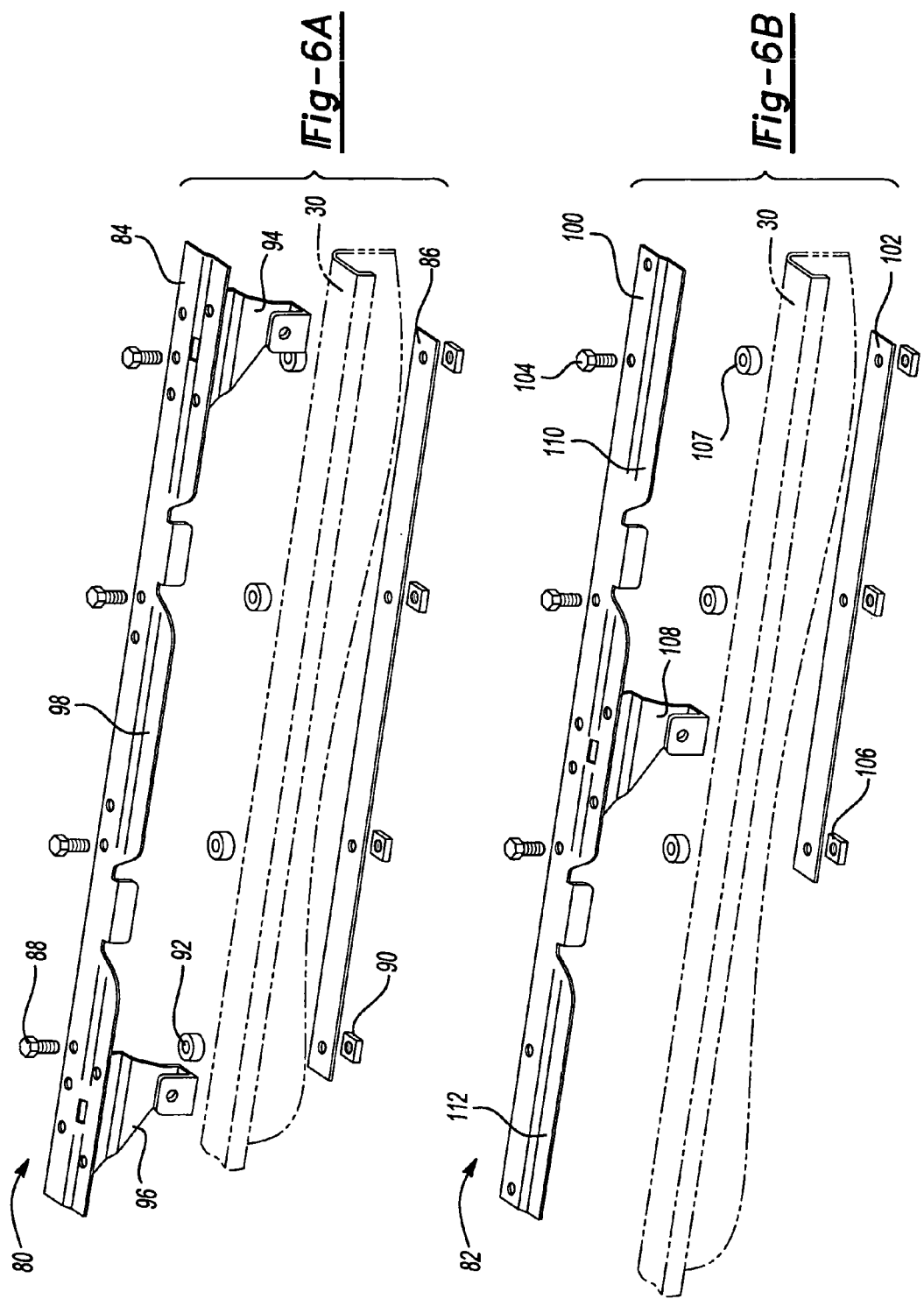

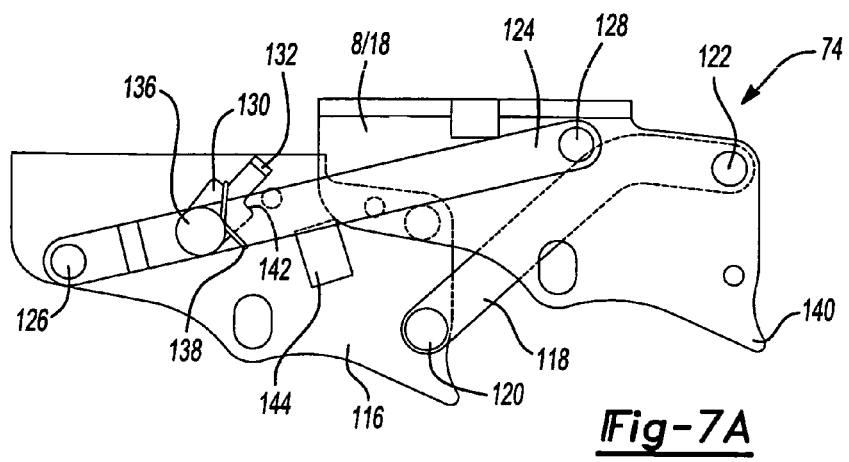
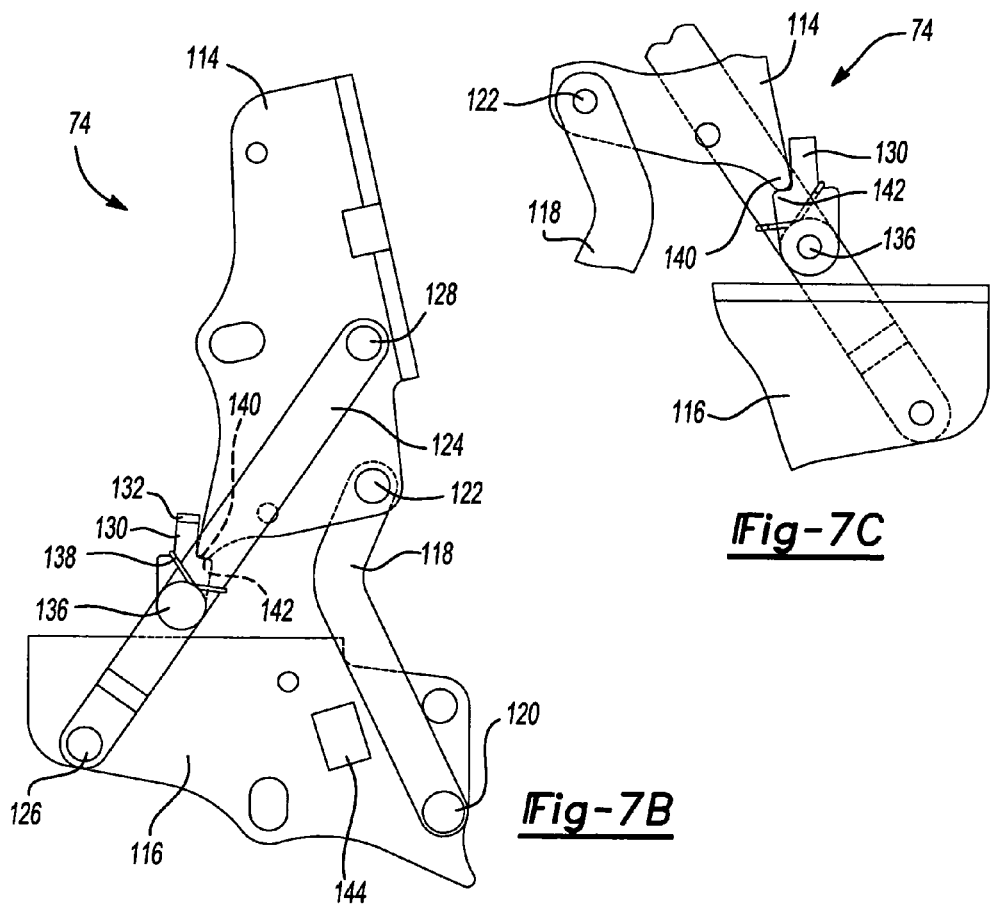

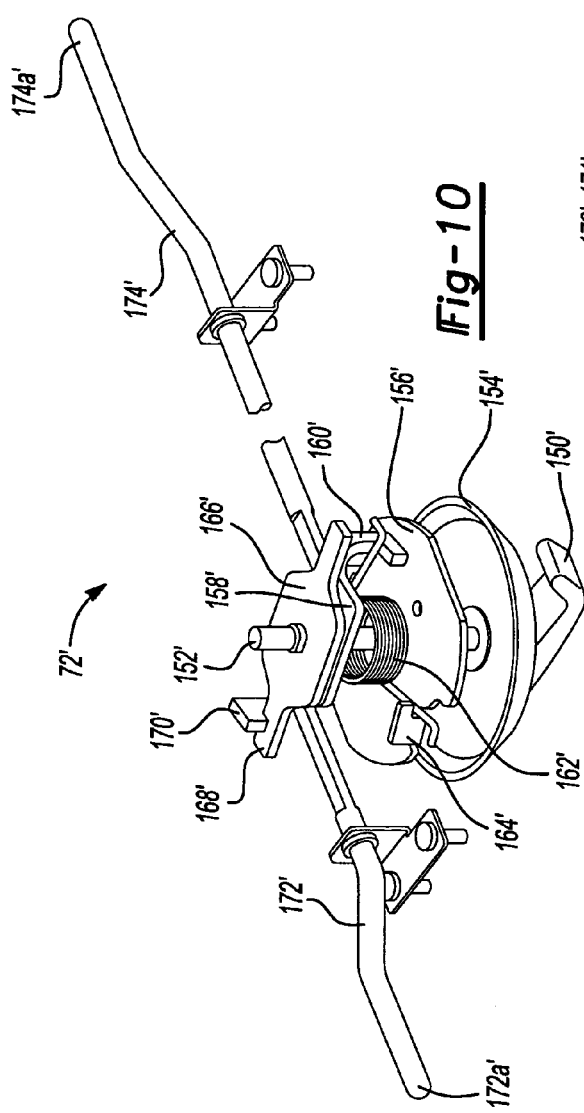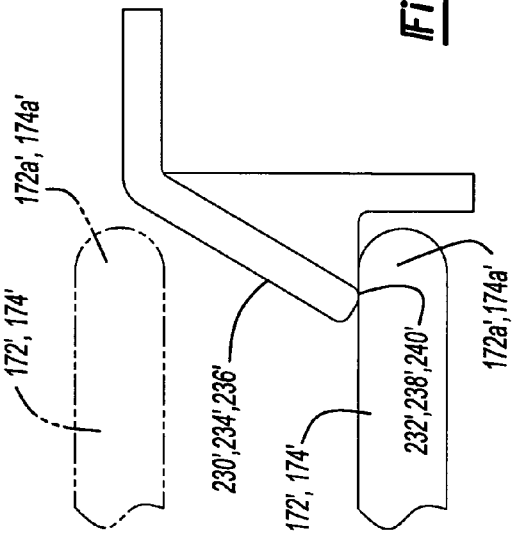

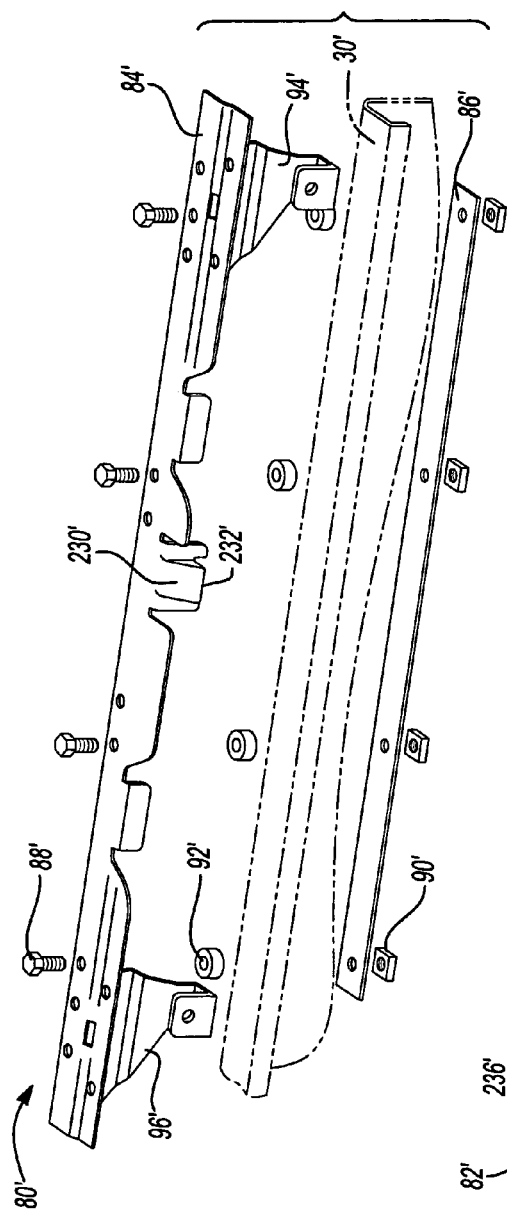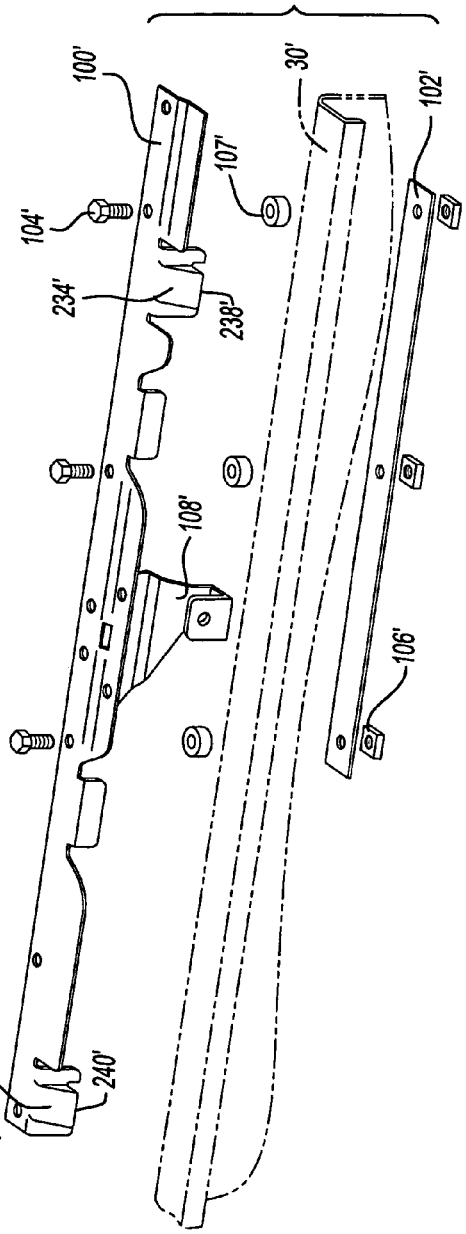

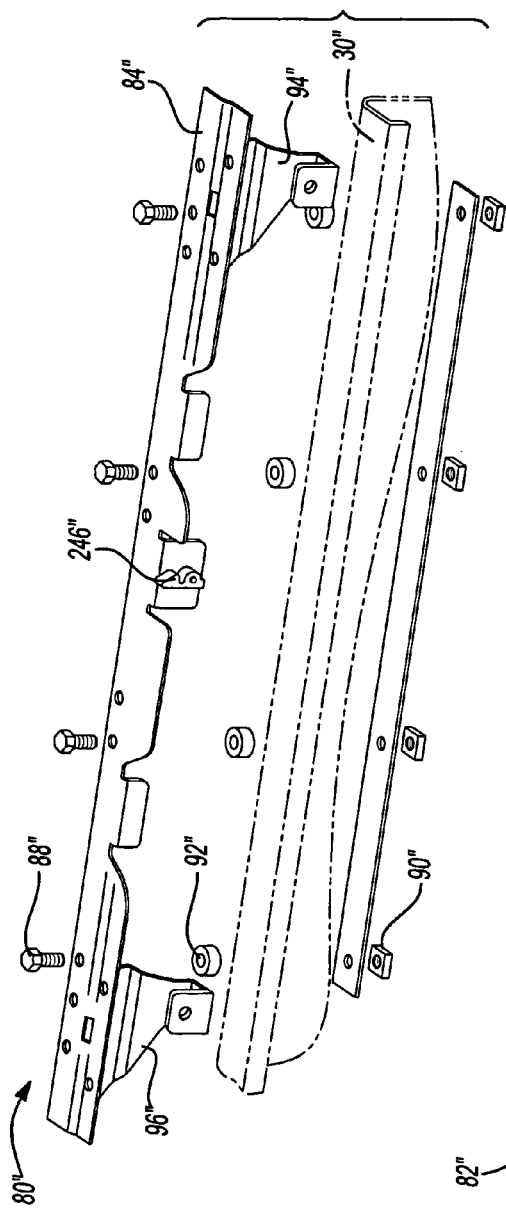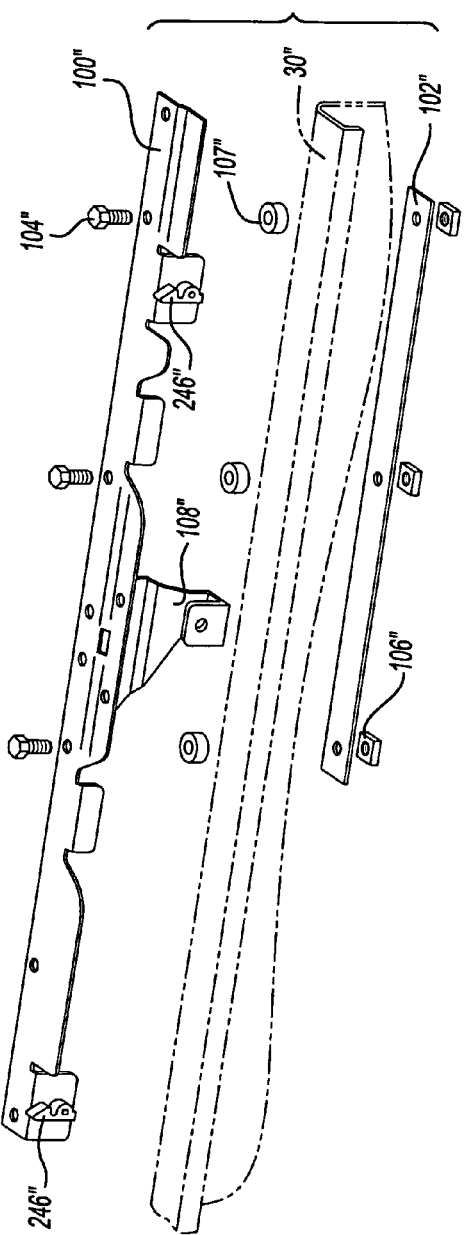

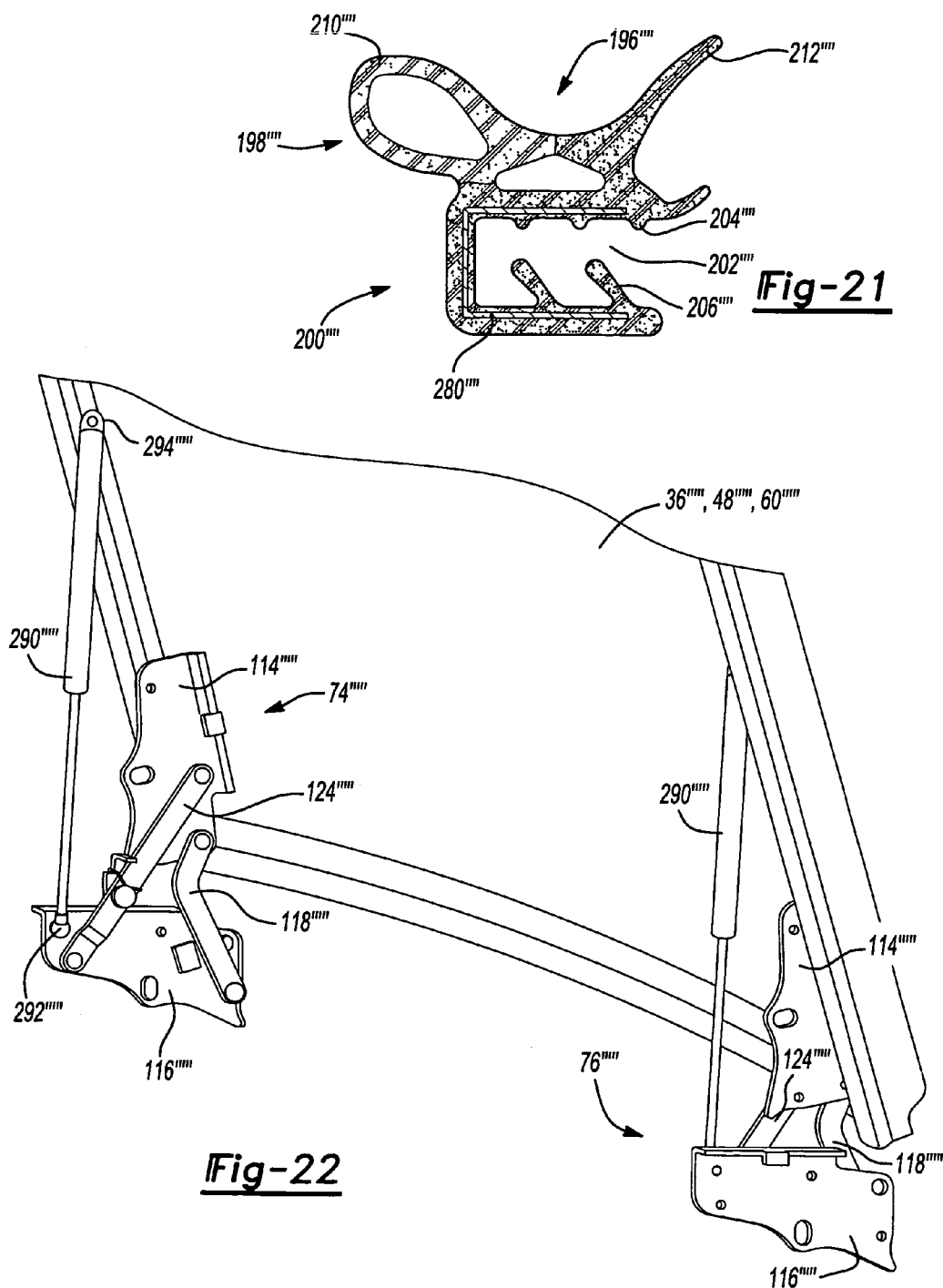

TONNEAU COVER FOR AUTOMOTIVE VEHICLE

CROSS-REFERENCE TO RELATED APPLICATIONS

This application claims the benefit of U.S. Provisional Application No. 60/477,724, filed on Jun. 11, 2003. The disclosure of the above application is incorporated herein by reference.

BACKGROUND AND SUMMARY OF THE INVENTION

This invention pertains generally to a tonneau cover for an automotive vehicle and more specifically to a tonneau cover that encloses a bed of a pickup truck.

Pickup trucks have gained popularity and are put to a variety of uses. A pickup truck typically has a passenger compartment and an open cargo area or truck bed behind or aft of the passenger compartment. The truck bed is generally rectangular in shape and has a bottom and four side walls that extend upwardly from the bottom. The rear side wall is a tail gate and is movable between a closed or upright position and an open or horizontal position. The truck bed is open on the top and exposed to the elements. The truck bed is used to haul or stow a variety of goods. The versatile use to which the truck beds are employed may require the truck bed to be covered or enclosed to protect the goods stored therein from the elements. To this end, a variety of systems or covers have been developed that enclose portions or an entirety of the truck bed to protect the goods stored therein from the elements. Some of these covers extend upwardly from the truck bed to increase the enclosed volume while others, typically referred to as tonneau covers, extend generally horizontally across the tops of or between the side walls to enclose the truck bed.

In accordance with the present invention, the preferred embodiment of a tonneau cover employs a plurality of independently operable panels that extend across the truck bed. In one aspect of the present invention, the panels are arranged so that the tailgate can be moved between its open and closed position regardless of the positions of the panels. In another aspect of the present invention, each of the panels has a latch assembly that employs an initiator such that when the latch assembly is operated to unlatch the panel, the initiator encourages movement of the panel so that the panel to an ajar position to facilitate movement from its closed position to its open position. In a further aspect of the present invention, the panels are connected to the automotive vehicle by a hinge assembly that includes a biased prop that automatically engages to hold the panel in an open position and prevent the inadvertent closing of the panel. In still another aspect of the present invention, the hinge assemblies on the panels are mounted to the automotive vehicle by two different pairs of mounting assemblies wherein the first pair includes two latching surfaces and one hinge assembly mounting location and the other pair include one latching surface and two hinge assembly mounting areas. In yet a further aspect of the present invention, a two-way operable seal is employed between adjacent panels that seals the panels regardless of the sequence in which the two adjacent panels are closed.

The tonneau cover of the present invention is advantageous over traditional tonneau covers in that the present invention allows each of the panels to be operated independently of one another so that different areas of the truck bed can be accessed independently of the other areas of the truck bed. Another advantage of the present invention is that the tailgate can be moved between an open and closed position regardless of the positioning of an adjacent panel which gives further options on accessing the truck bed. The use of an automatically actuating prop is advantageous in that the prop minimizes the possibility of the panel being inadvertently closed. The mounting assemblies employed with the panels of the present invention is advantageous over the traditional mounting system due to the simple design and incorporation of multiple functions into each of the assemblies. The seal between adjacent panels is further advantageous over that employed in traditional tonneau panels by enabling a water tight seal to be achieved between the adjacent panels regardless of the sequence in which the panels are closed. Additional advantages and features of the present invention will become apparent from the following description and appended claims, taken in conjunction with the accompanying drawings.

BRIEF DESCRIPTION OF THE DRAWINGS

The present invention will become more fully understood from the detailed description and the accompanying drawings, wherein:

FIG. 4 is a perspective view of the interior surface of the center panel when in the open position;

FIGS. 6A–B are exploded views of the two types of mounting assemblies that are employed along each side of the truck bed;

FIG. 7A is an interior side elevation view of the driver side hinge assembly in a closed position;

FIG. 7B is an interior side elevation view of the hinge assembly of FIG. 7A in an open and locked position;

FIG. 7C is a fragmented exterior side elevation view of the hinge assembly of FIG. 7B;

FIG. 10 is a perspective view of the latch assembly according to the second preferred embodiment of the present invention;

FIGS. 11A and B are exploded views of the mounting assemblies according to the second preferred embodiment of the present invention;

FIG. 13 is a fragmented side view of the engagement between the latching ends and the camming surface according to the second preferred embodiment of the present invention;

FIGS. 14A and B are exploded views of the mounting assemblies according to the first alternate embodiment of the present invention;

FIG. 21 is a cross-sectional view of the two-way acting seal according to a third preferred embodiment of the present invention; and FIG. 22 is a perspective view of the interior surface of a tonneau panel in the open position showing the hinge assembly according to a fourth preferred embodiment of the present invention.

DETAILED DESCRIPTION OF THE PREFERRED EMBODIMENT

The following description of the preferred embodiment is merely exemplary in nature and is in no way intended to limit the invention, its application, or uses.

Figure 1:
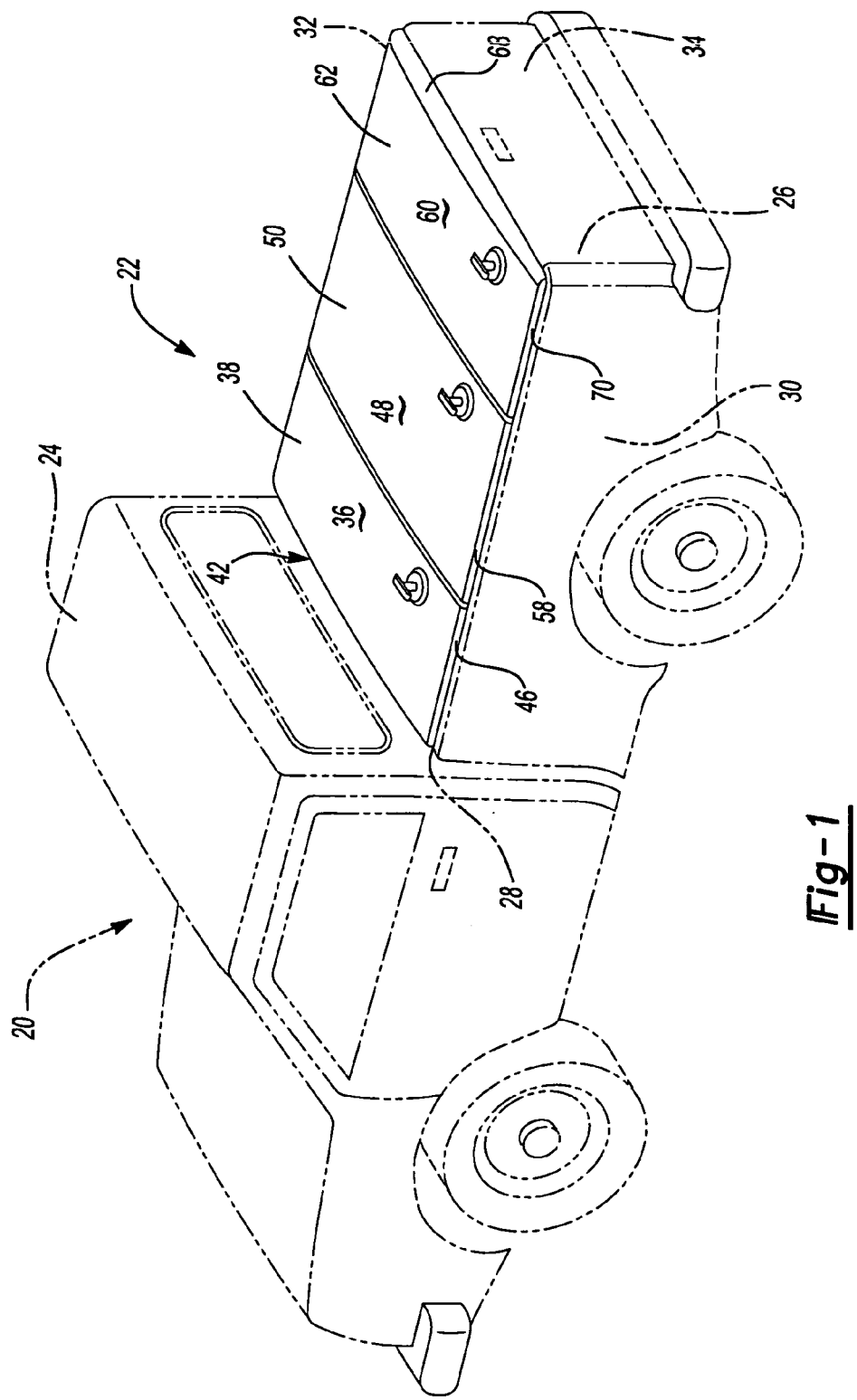
FIG. 1 is a perspective view of a pickup truck employing a tonneau cover according to the principles of the present invention.
Figure 2:
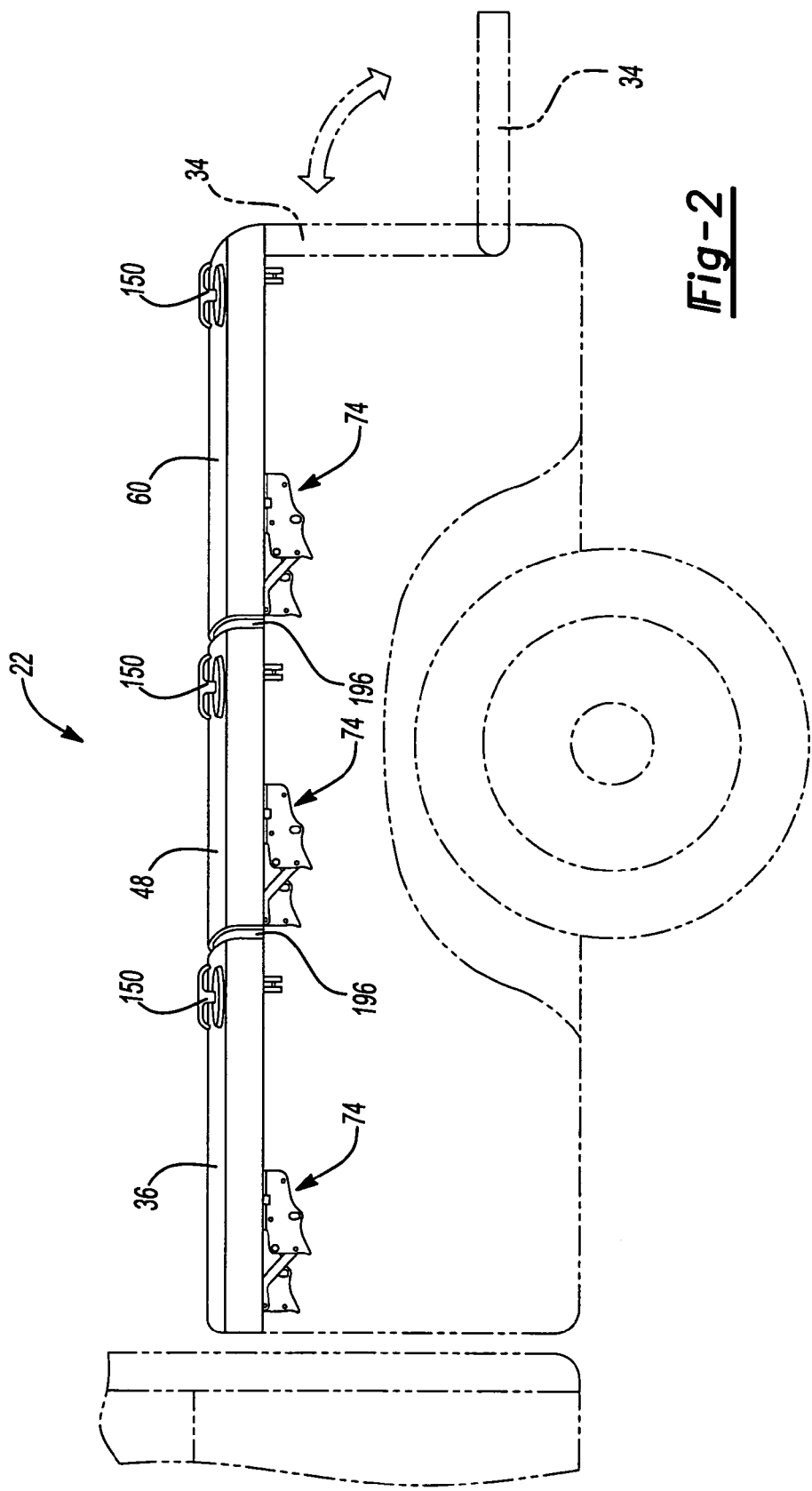
FIG. 2 is a fragmented side elevation view of the pickup truck of FIG. 1 with the tonneau cover panels in a closed position and the tailgate in both a closed and open position.

The first preferred embodiment of the present invention is shown in FIGS. 1–9C. An automotive vehicle 20, in this case in the form of a pickup truck, having a tonneau cover 22 according to the principles of the present invention is shown in FIG. 1. Pickup truck 20 includes a passenger compartment 24 and a storage compartment or truck bed 26 behind or aft of passenger compartment 24. Truck bed 26 is generally rectangular in shape and includes a bottom surface (not shown) and a front wall 28 and two side walls 30, 32 extending upwardly from the bottom surface. A tailgate 34 extends upwardly from the rear portion of the bottom surface. The bottom surface along with front wall 28, side walls 30, 32 and tailgate 34 define truck bed 26. Tonneau cover 22 extends over the top of truck bed 26 and rests on the top portions of front wall 28, side walls 30, 32 and tailgate 34 to enclose truck bed 26, as described below.

Tonneau cover 22 includes a first, front or forwardmost panel 36. Front panel 36 has opposite top (exterior) and bottom (interior) surfaces 38 and 40 that are separated by a side wall that includes a front portion 42, a rear portion 44 and side portions 46. Front panel 36 extends along the front portion of truck bed 26 with the bottom surface 40 adjacent front portion 42 positioned on the top surface of front wall 28 and bottom surface 40 adjacent side portions 46 positioned on the tops of side walls 30, 32 of truck bed 26 when front panel 36 is in a closed position. There is a second, center or middle panel 48 that covers a middle portion of truck bed 26. Center panel 48 has opposite top (exterior) and bottom (interior) surfaces 50, 52 that are separated by a side wall that includes a front portion 54, a rear portion 56 and side portions 58. Center panel 48 encloses a middle portion of truck bed 26 with bottom surface 52 adjacent side portions 58 positioned on the top surfaces of side walls 30, 32 of truck bed 26 and front portion 54 engaging with rear portion 44 of front panel 36 when panels 36, 48 are in the closed position. A third, rear or rearmost panel 60 covers a rear portion of truck bed 26. Rear panel 60 has opposite top (exterior) and bottom (interior) surfaces 62, 64 that are separated by a side wall having a front portion 66, a rear portion 68 and side portions 70. Rear panel 60 covers the rear portion of truck bed 26 with bottom surface 64 adjacent side portions 70 positioned on top of side walls 30, 32 of truck bed 26, bottom surface 64 adjacent rear portion 68 positioned on top of tailgate 34 and front portion 66 engaging with rear portion 56 of center panel 48 when panels 48, 60 are in the closed position.

Panels 36, 48, 60 enclose an entirety of truck bed 26 and are sealed against the top surface of front wall 28, side walls 30, 32 and tailgate 34 and to each other to provide a weather-tight tonneau cover 22 to prevent the elements from entering into truck bed 26, as described below. Panels 36, 48, 60 are crowned between their side portions to direct fluid on the top surfaces to flow toward the side portions and away from truck bed 26. Panels 36, 48, 60 are substantially rigid in that only limited deflection of the panels 36, 48, 60 occurs during normal use. Panels 36, 48, 60 are preferably made from SMC 27–30% roving mat glass, although other materials can be used. For example, SRIM 30% roving mat glass can also be used. The use of these materials allows panels 36, 48, 60 to be of light weight for easy operation and removal. Panels 36, 48, 60 are preferably about 10–15 mm in thickness and each weigh between about 11 to 20 lbs. without any hardware installed thereon. With the hardware, discussed below, attached to panels 36, 48, 60 each panel has a removed weight of between about 20 to 34 lbs.

Figure 3A:
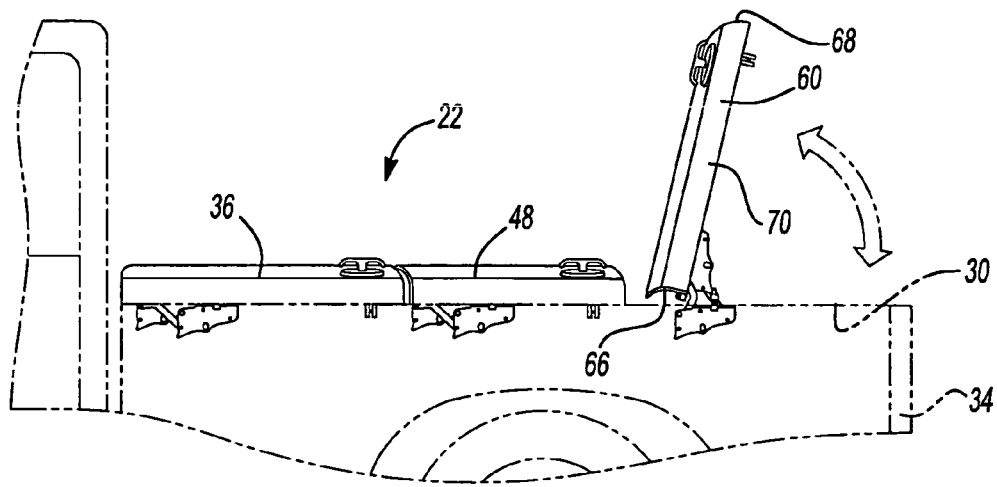
FIGS. 3A–C are side elevation views of the tonneau cover of FIG. 1 with the respective rear, center and front tonneau panels in an open position.
Figure 3B:
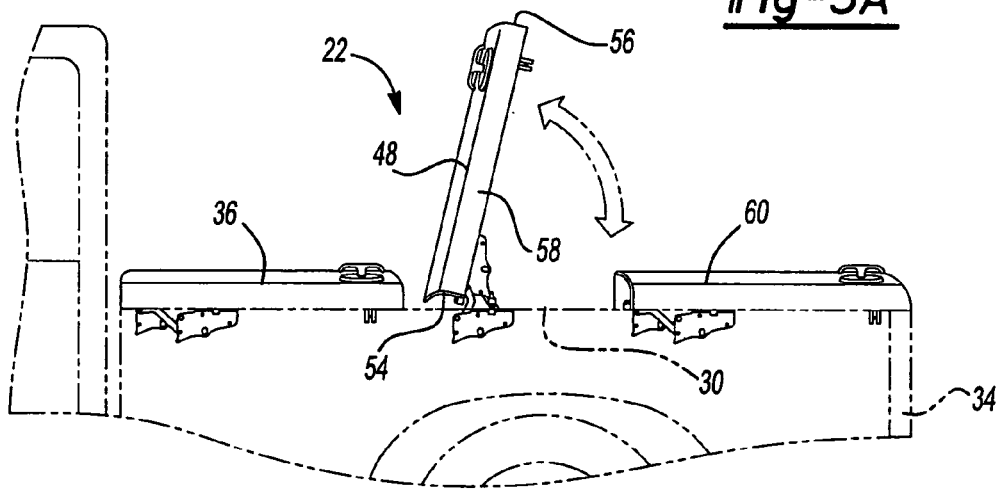
Figure 3C:
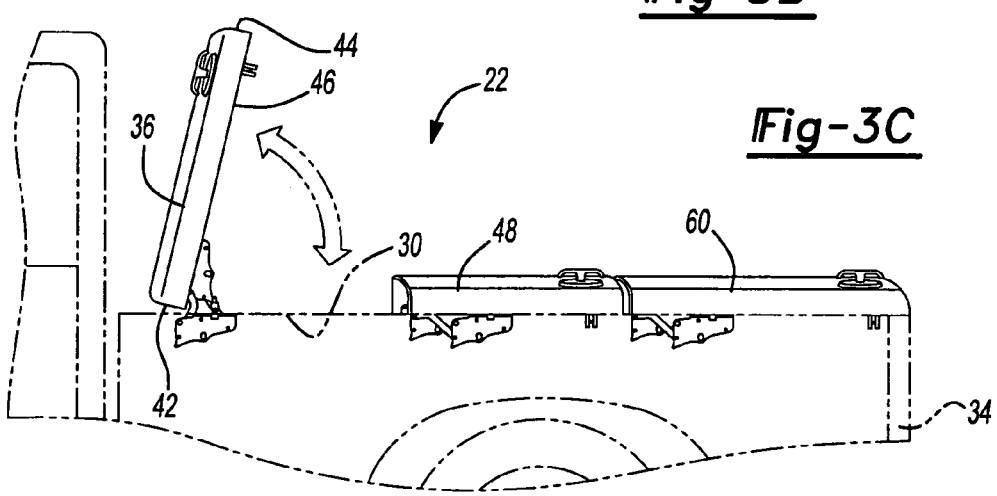

Tonneau cover 22 allows tailgate 34 to move between closed (upright) and open (horizontal) positions (FIG. 2) while rear panel 60 is in its closed position. Each panel 36, 48, 60 is operable between a closed (generally horizontal) position and an open (inclined) position independently of each other, as shown in FIGS. 3A–C. In other words, each panel 36, 48 and 60 can be moved between its open and closed positions regardless of the positioning of the other panels to allow access to different portions of truck bed 26. Panels 36, 48, 60 are each oriented and open in the same direction with the rear portions moving upwardly and forwardly, as shown.

Referring now to FIG. 4, the bottom or interior surface 52 of center panel 48 is shown with center panel 48 in its open position. Center panel 48 includes a latch assembly 72 positioned on a rear portion that is operable to selectively secure and release center panel 48 from a closed position, as described below. Center panel 48 also includes a driver side hinge assembly 74 and a passenger side hinge assembly 76 adjacent side portions 58 and front portion 54. Hinge assemblies 74, 76 control movement of center panel 48 between its open and closed positions, as described below. Similarly, front panel 36 and rear panel 60 also have a latch assembly 72 positioned on a rear portion thereof and driver and passenger side hinge assemblies 74, 76 positioned adjacent the front and side portions thereof.

Hinge assemblies 74, 76 are attached to either a front mounting assembly 80 or a rear mounting assembly 82

Figure 5A:
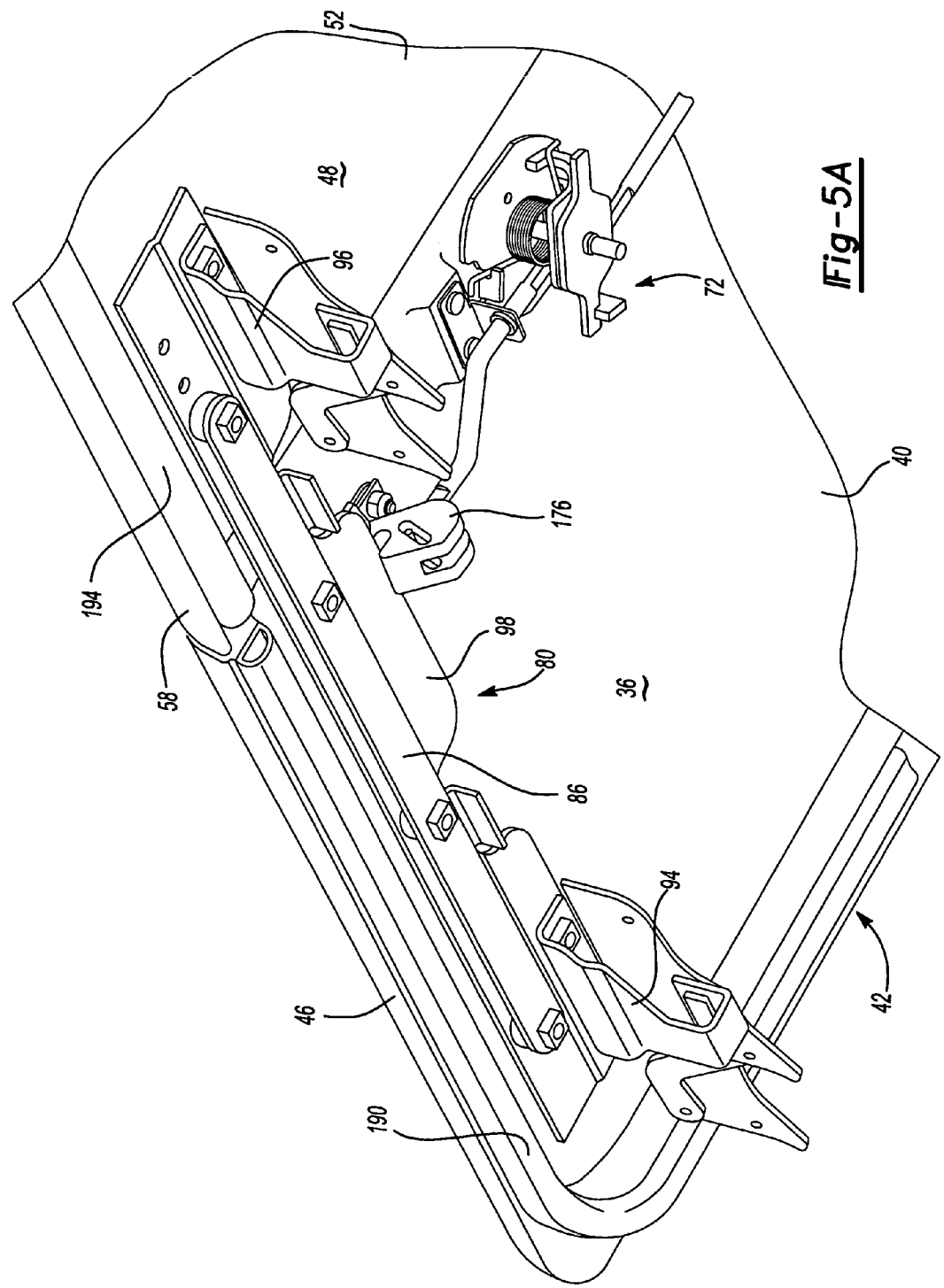
FIGS. 5A–B are fragmented perspective views of the interior surfaces of the tonneau panels of FIG. 1 in the closed position.

(FIGS. 5A–B) depending upon which panel hinge assemblies 74, 76 are attached to. Specifically, front mounting assembly 80 is used to attached hinge assemblies 74, 76 on front and center panels 36, 48 to truck bed 26, as shown in FIG. 5A. Rear mounting assembly 82 is used to attach hinge assemblies 74, 76 on rear panel 60 to truck bed 26. Each mounting assembly 80, 82, as shown in FIGS. 6A–B, is configured to be attached to a top portion (bed rail) of one of side walls 30, 32 of truck bed 26. Specifically, front mounting assembly 80 is attached to one of side walls 30, 32 near front wall 28 while rear mounting assembly 82 is attached to one of side walls 30, 32 near tailgate 34. Front mounting assembly 80 includes a top plate 84 that is positioned on top of one of side walls 30, 32 and a bottom or stiffening plate 86 that is positioned beneath the top surface of one of side walls 30, 32. The top portion of side walls 30, 32 are sandwiched between top plate 84 and bottom plate 86. Top and bottom plates 84, 86 are secured together by bolts 88 and nuts 90 that are welded to bottom plate 86. Bushings 92 are positioned between top plate 84 and the top surface of the bed rail. Top plate 84 includes two generally U-shaped extensions 94, 96 that extend downwardly from top plate 84. Extensions 94, 96 are used to attached hinge assemblies 74, 76 to front mounting assembly 80. Top plate 84 also includes a latch surface or lip 98 that latch assembly 72 on front panel 36 uses to secure front panel 36 in the closed position, as described below.

Figure 5B:
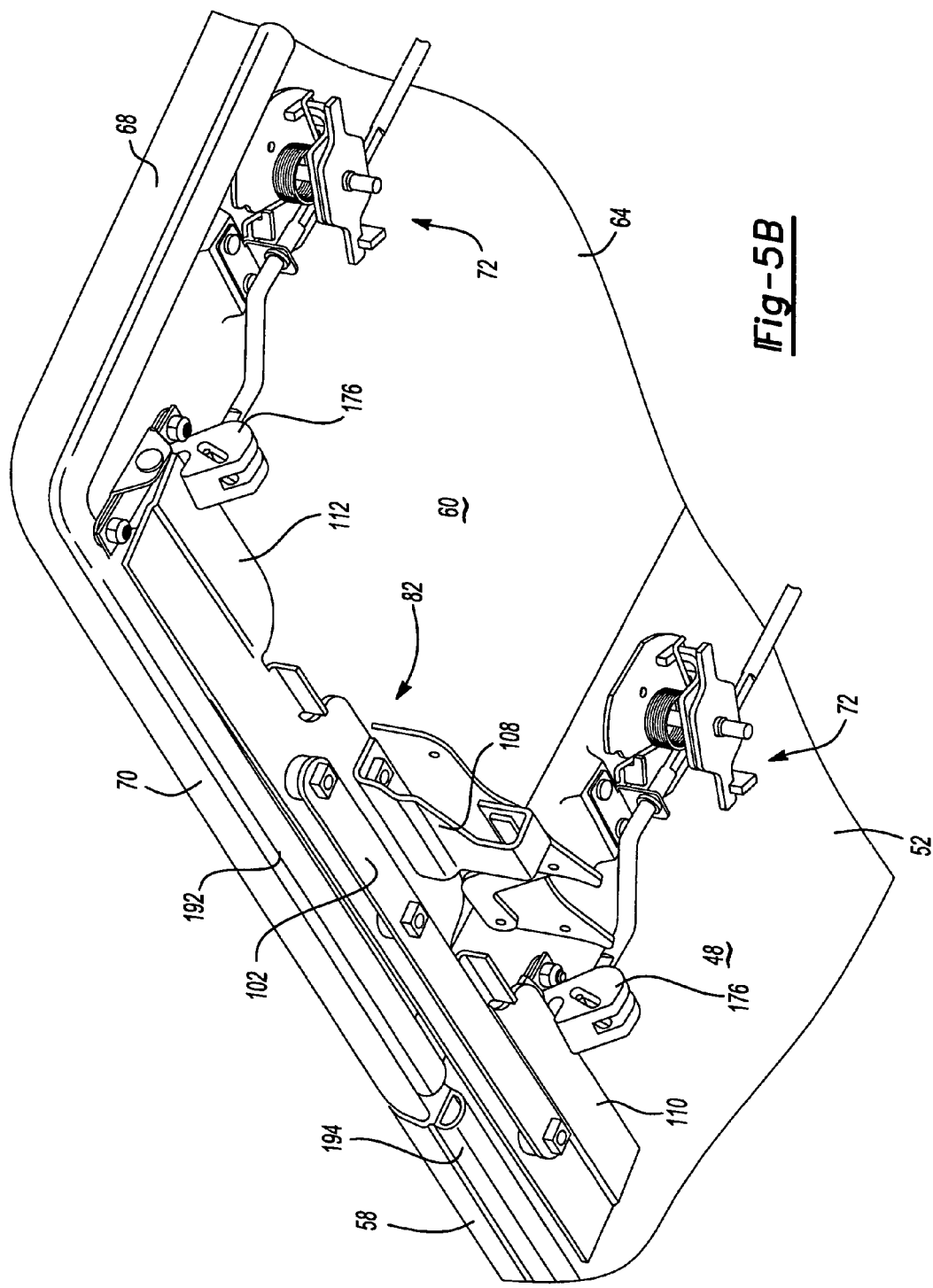

Rear mounting assembly 82 is attached to a rear portion of each side wall 30, 32 adjacent tailgate 34. Rear mounting assembly 82 includes a top plate 100 and a bottom or stiffening plate 102. Top and bottom plates 100, 102 sandwich the bed rail of side walls 30, 32 therebetween and are secured together by bolts 104 and nuts 106 that a welded to bottom plate 102. Bushings 107 are positioned between top plate 100 and the top side of the bed rail. Top plate 100 has a downwardly extending generally U-shaped extension 108 that is used to attach hinge assemblies 74, 76 on rear panel 60 to rear mounting assembly 82, as shown in FIG. 5B. Top plate 102 also includes two latching surfaces or lips 110, 112 to which the respective latch assemblies 72 attached to center and rear panels 48, 60 engage with to secure center and rear panels 48, 60 in the closed position, as described below.

Hinge assemblies 74, 76, as stated above, are operable to control the movement of panels 36, 48, 60 between their closed and open positions. Driver side hinge assembly 74 is shown in FIG. 7A in the closed position and is shown in FIGS. 7B and C in the open position. Hinge assembly 74 includes a generally L-shaped panel bracket 114 configured to be attached to one of panels 36, 48, 60. Panel bracket 114 is attached to one of panels 36, 48, 60 with mechanical fasteners, such as nuts and bolts (not shown). Hinge assembly 74 also includes a generally L-shaped mounting bracket 116 that is configured to be attached to one of mounting assemblies 80, 82. Specifically, mounting bracket 116 is attached to the top plate and one of the U-shaped extensions on either top plate 84 or top plate 100 of respective front and rear mounting assemblies 80, 82 with easily removable mechanical fasteners, such as a bolt with a finger grip or knob and a nut welded to the extension(s) and the top plate. The use of easily removable fasteners enables each panel 36, 48, 60 to be quickly and easily removed from truck bed 26 independently of the other panels. One end of a first link 118 is pivotally connected to mounting bracket 116 at pivot 120 while an opposite end of first link 118 is pivotally connected to panel bracket 114 at pivot 122. One end of a second link 124 is pivotally connected to mounting bracket 116 at pivot 126 while an opposite end of second link 124 is pivotally connected to panel bracket 114 at pivot 128. Thus, panel bracket 114, first link 118, mounting bracket 116 and second link 124 form a four-bar linkage assembly defined by pivots 122, 120, 126 and 128 that controls the movement of panels 36, 48, 60 between open and closed positions.

Hinge assembly 74 and the four-bar linkage are configured to cause the front portions of panels 36, 48, 60 to move both rearwardly and angularly and the rear portions of panel 36, 48, 60 to move both upwardly, forwardly and angularly as panels 36, 48, 60 move from the closed position toward the open position. This rearwardly and angularly movement of the rear portions of panels 36, 48, 60 facilitates the sealing of adjacent panels to one another to provide a weather-tight enclosure for truck bed 26, as described below. Second link 124 includes a locking member or prop 130 with an integral handle projection 132 extending inwardly therefrom. Prop 130 is pivotally connected to second link 124 at pivot 136. Prop 130 includes a torsion spring 138 that biases prop 130 toward pivot 128. Prop 130 co-acts with an end projection 140 on panel bracket 114 to lock hinge assembly 74 in the open position, as shown in FIGS. 7B and C and described below. Passenger side hinge assembly 76 is essentially a mirror image of driver side hinge assembly 74. The main difference between passenger side hinge assembly 76 and driver side hinge assembly 74 is that passenger side hinge assembly 76 does not include prop 130 and does not function to lock the attached panel in the open position.

When the panel to which hinge assembly 74 is attached is being moved from the closed position to the open position, end projection 140 on panel bracket 114 approaches prop 130. Continued movement of the panel eventually causes end projection 140 to engage with prop 130 and move along the side of prop 130 which causes prop 130 to rotate about pivot 136 away from pivot 128. Continued movement causes end projection 140 to engage with a shoulder 142 on prop 130 and thereby secure the attached panel and hinge assembly 74 in the open position, as shown in FIGS. 7B and C. The panel and hinge assembly 74 can continue moving to a more open position until first link 118 encounters a stop 144 on mounting bracket 116 whereby further movement of the panel to a more open position is inhibited. To move the panel and hinge assembly 74 from the open and locked position to the closed position, handle projection 132 is used to pivot prop 130 about pivot 136 away from pivot 128 thereby disengaging shoulder 142 from end projection 140. The panel and hinge assembly 74 can then be moved from the open position to the closed position. Thus, hinge assemblies 74, 76 enable a single individual on the driver side of pickup truck 20 to unlock the panel(s) when in the open position and move the panel(s) to a closed position without requiring assistance or moving to the passenger side of pickup truck 20.

Figure 8:
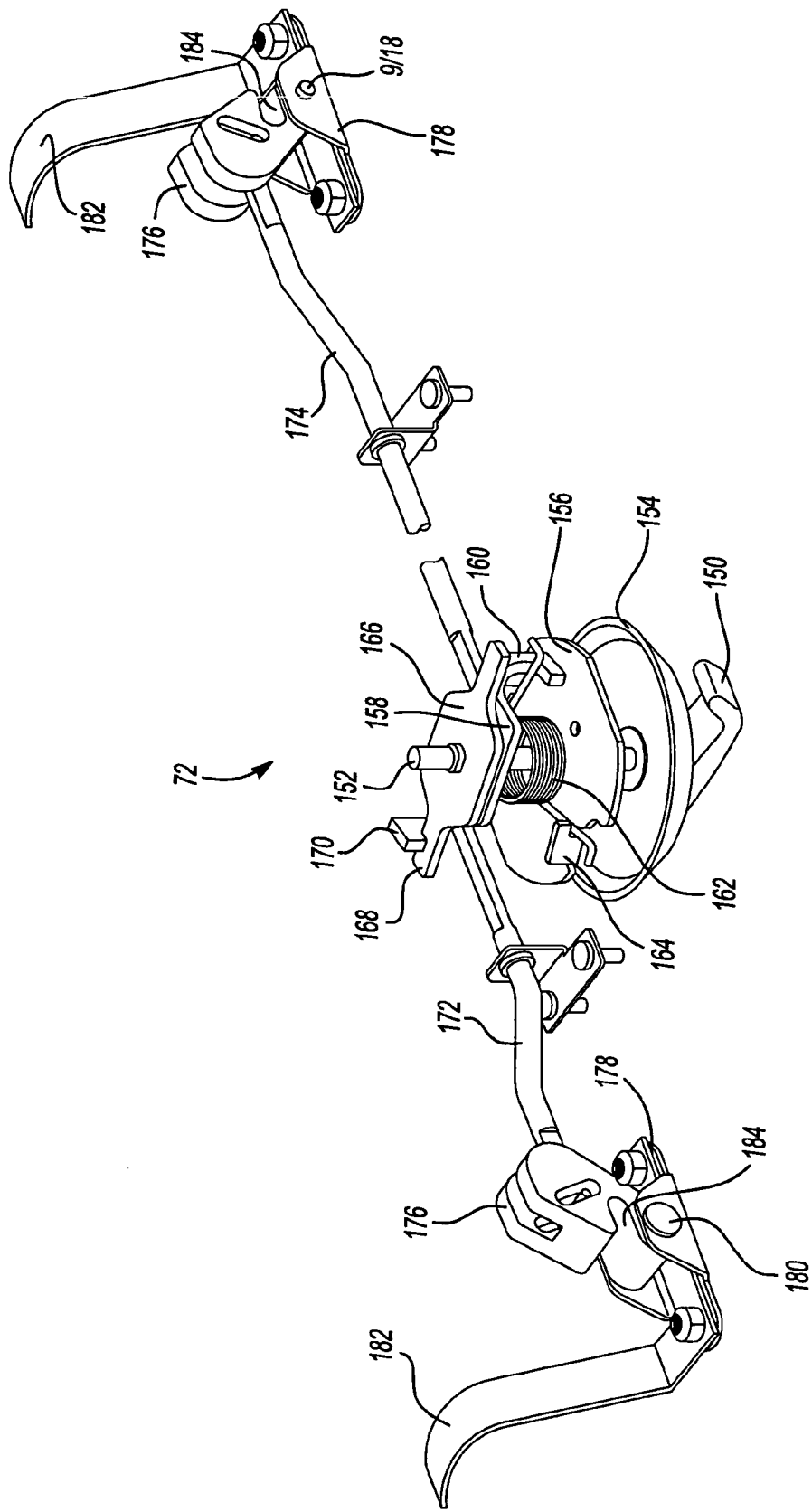
FIG. 8 is a perspective view of the latch assembly employed on each of the tonneau cover panels.

As stated above, each panel 36, 48, 60 has a latch assembly 72 attached to a rear portion of the bottom or interior surface. Latch assembly 72, as best seen in FIG. 8, includes a generally T-shaped handle 150 that is attached to a shaft 152. Handle 150 extends above the top surface of the panel to which it is attached and includes a key operated lock (not shown) that inhibits rotation of handle 150 when in a locked position and allows rotation of handle 150 when in an unlocked position. There is a top plate 154 that is positioned on the top surface of the panel to which latch assembly 72 is affixed. There is a stationary plate 156 that resides adjacent the bottom surface of the panel to which latch assembly 72 is affixed. A middle plate 156 is positioned on shaft 152 and is capable of rotating independently of shaft 152. Middle plate 158 has an arm 160 that extends upwardly and is engaged with one end of a torsion spring 162 that is position on shaft 152. An opposite end of torsion spring 162 is engaged with an arm 164 that extends from stationary plate 156. Stationary plate 156 and torsion spring 162 bias middle plate 158 to a position that corresponds to latch assembly 72 being in a latched or closed position. There is a bottom plate 166 that is fixedly attached to shaft 152 such that bottom plate 166, shaft 152 and handle 150 all rotate in unison and no relative rotation is possible. Bottom plate 166 has an extension 168 that engages with an arm 170 that extends from middle plate 158. The engagement of extension 168 with arm 170 enables bottom plate 166 to cause middle plate 158 to rotate with rotation of bottom plate 166. There are a pair of connecting rods 172, 174 that each have an end pivotally connected to middle plate 158 on opposite sides of shaft 152 and that each have opposite ends that are attached to catches 176. Catches 176 are pivotally attached to brackets 178 at pivots 180. Each bracket 178 is attached to the bottom surface of one of the panels adjacent the side walls thereof. An initiator 182, in this case in the form of a leaf spring, is attached to each of brackets 178. Leaf springs 182 engage with and are compressed against one of top plates 84, 100 of mounting assemblies 80, 82 when the panel is in the closed position. Leaf springs 182 act as a starter in that when latch assembly 72 is rotated to unlatch the panel from the top plate leaf springs 182 encourage the rear portion of the panel to become ajar from the truck bed thereby facilitating the manual movement of the panel from the closed position to the open position. Catches 176 each have a channel 184 that engages with latching surfaces or lips 98, 110 or 112 when the panel is in the closed position, as described below.

Latch assembly 72 is self latching, also known as auto catching, in that torsion spring 162 biases middle plate 158 relative to stationary plate 156 which causes connecting rods 172 and 174 to bias catches 176 to their closed position. When tonneau panel is moved from an open position to a closed position, catches 176 engage with one of latching surfaces 98, 110, 112 and pivot away from the latching surface about pivot 180 due to the allowed relative rotation of middle plate 158 relative to stationary plate 156. Catches 176 resist this rotation due to the biasing of torsion spring 162. When the panel has been closed a sufficient amount, one of latching surfaces 98, 110, 112 engages with channel 184 and catches 176 then rotate outwardly about pivot 180 to secure the panel in the closed position. When it is desired to open the panel, handle 150 is rotated which in turn causes shaft 152 to rotate and also causes bottom plate 166 to rotate. Rotation of bottom plate 166 causes extension 168 to engage with arm 170 of middle plate 158 thereby causing connecting rods 172 and 174 to pull catches 176 inwardly about pivots 180. With the catches 176 pulled inwardly a sufficient distance, channels 184 disengage from the latching surfaces and springs 182 encourage the panel to pop open to a slightly ajar position. The panel can then be easily moved upwardly to its fully opened and locked position.

As stated above, tonneau cover 22 is configured to provide a weather-tight seal against truck bed 26 to prevent the elements from entering truck bed 26. To accomplish this, panels 36, 48, 60 include a variety of seals that engage with the tops of front wall 28, side walls 30, 32, tailgate 34, and adjacent panels. Specifically, as best seen in FIG. 5A, front panel 36 has a generally D-shaped seal 190 that extends along bottom surface 40 adjacent side portions 46 and front portion 42. Seal 190 on front panel 36 engages with the top surface of front wall 28 and side walls 30, 32 to provide a weather-tight seal along those three edges of front panel 36. Similarly, rear panel 60, as best seen in FIG. 5B, includes a generally D-shaped seal 192 that extends along bottom surface 64 adjacent rear portion 68 and side portions 70. Seal 192 engages with the top surface of tailgate 34 and side walls 30, 32 to provide a weather-tight seal along those three edges of rear panel 60. Center panel 48, as shown in FIGS. 5A and B, also includes a generally D-shaped seal 194 that extends along bottom surface 52 adjacent side portions 58. Seal 194 seals against the top surface of side walls 30, 32 to provide a weather-tight seal along the sides of center panel 48. Seals 190, 192, 194 can be made from a variety of materials. For example, seals 190, 192, 194 can be made from EPDM rubber.

Figure 9A:
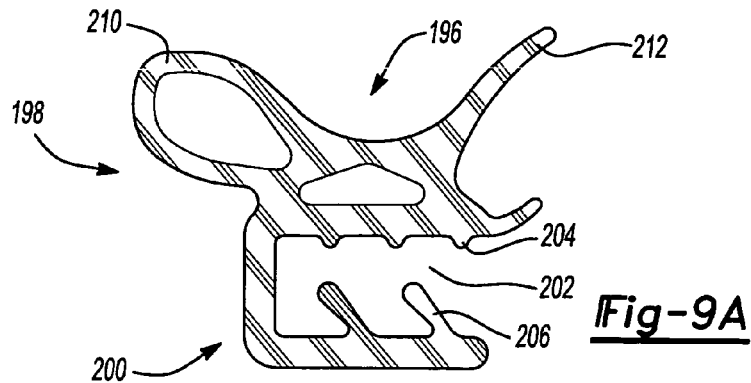
FIG. 9A is a cross-sectional view of the two-way seal employed between adjacent panels when in a relaxed state.
Figure 9B:
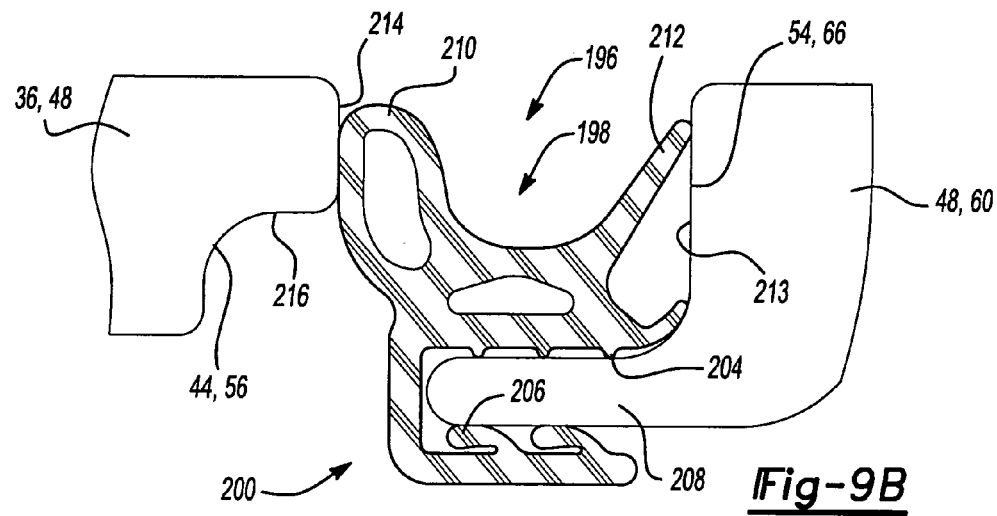
FIG. 9B is a cross-sectional view of the two-way seal of FIG. 9A when the rearmost of the two adjacent tonneau panels is closed last.

To seal between adjacent panels, such as between rear portion 44 of front panel 36 and front portion 54 of center panel 48 and between rear portion 56 of center panel 48 and front portion 66 of rear panel 60, a dual or two-way acting seal 196, as shown in FIG. 9A, is utilized. Specifically, one seal 196 is attached to front portion 54 of center panel 48 to seal between rear portion 44 of front panel 36 and front portion 54 of center panel 48 while another seal 196 is attached to front portion 66 of rear panel 60 to seal between rear portion 56 of center panel 48 and front portion 66 of rear panel 60. Seal 196 is a two-way acting seal because it is operable to provide a weather-tight seal between adjacent panels regardless of the sequence in which the panels are closed, as described below. Seal 196 includes an upper portion 198 and a generally U-shaped lower portion 200 having a channel 202 therein. Lower portion 200 has a plurality of nubs 204 along the upper surface of channel 202 that extend slightly into channel 202 and a plurality of projections 206 along a lower surface of channel 202 that extend significantly into channel 202. Nubs 204 and projections 206 co-act to hold seal 196 to front portion 54 of center panel 48 or to front portion 66 of rear panel 60. Specifically, front portions 54, 66 of center and rear panels 48, 60 include an extension 208 that extends forwardly and fits within channel 202. Nubs 204 and projections 206 grip extension 208 to hold seal 196 in position on one of front portions 54, 66 of respective center and rear panels 48, 60, as shown in FIGS. 9B and C. Upper portion 198 has a hollow bulbous projection 210 extending upwardly and forwardly therefrom. Projection 210 seals against one of rear portions 44 of front panel 36 and rear portion 56 of center panel 48 depending upon which panel seal 196 is affixed to. A finger 212 extends upwardly and rearwardly from upper portion 198. Finger 212 engages with a vertical section 213 of the front portion of the panel upon which seal 196 is affixed, as shown in FIGS. 9B and C. Seal 196 can be made from a variety of materials. For example, seal 196 can be made from EPDM rubber.

Figure 9C:
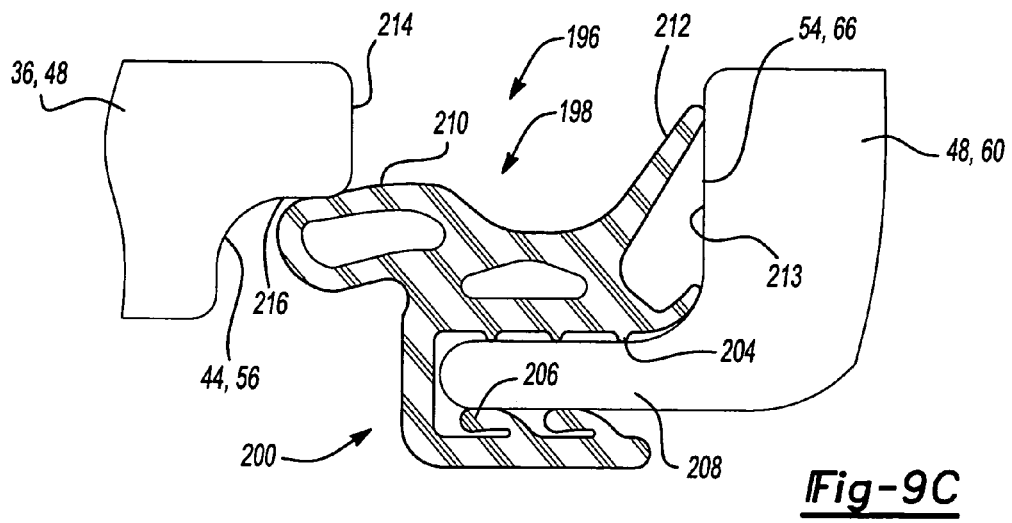
FIG. 9C is a cross-sectional view of the two-way seal of FIG. 9A when the frontmost of the two adjacent panels is closed last.

As stated above, seal 196 is a two-way acting seal such that seal 196 provides a weather-tight seal between adjacent panels regardless of the sequence in which the adjacent panels are closed. That is, as shown in FIG. 9B, when the more rearward of two adjacent panels is closed last, projection 210 engages with a generally vertical section 214 of the rear portion of the more forward panel which causes projection 210 to be compressed upwardly and rearwardly. The engagement between projection 210 and the vertical section 214 of the rear portion of the more forward panel in conjunction with the engagement of finger 212 with the vertical section 213 of the front portion of the more rearward panel provides a weather-tight seal between the two adjacent panels. When the more forward of the two adjacent panels is closed last, as shown in FIG. 9C, a generally horizontal section 216 of the rear portion of the more forward of the two adjacent panels engages with projection 210 and causes projection 210 to be compressed downwardly and forwardly. The engagement of projection 210 with the horizontal section 216 of the rear portion of the more forward panel in conjunction with the engagement of finger 212 with the vertical section 213 of the forward portion of the more rearward panel provides a weather-tight seal between the two adjacent panels. Thus, seal 196 is a two-way acting seal that provides a weather-tight seal between two adjacent panels regardless of the sequence in which the two panels are closed. Accordingly, panels 36, 48, 60 in conjunction with seals 190, 192, 194 and 196 provide for a weather-tight tonneau cover 22 that protects truck bed 26 from the elements.

A second preferred embodiment of the present invention is shown in FIGS. 10–13. The second preferred embodiment is substantially the same as the first preferred embodiment with the difference being the manner in which the panels are latched in the closed position. Referring to FIG. 10, latching assembly 72' according to the principles of the second preferred embodiment are shown. Latching assembly 72' is essentially identical to latching assembly 72 with the difference being that latching assembly 72' does not utilize the catches on the ends of the connecting rods. Rather, in this embodiment the ends 172a', 174a' of the respective connecting rods 172', 174' operate as latching ends and slide along camming surfaces on an associated front mounting assembly 80' or rear mounting assembly 82' when the associated panel is being closed. The latching ends 172a', 174a' engage with a lip on the associated mounting assembly to secure the panel in a closed position, as described below. Latch assembly 72' is self-latching in that torsion spring 162' biases middle plate 158' relative to stationary plate 156' which causes connecting rods 172', 174' to bias latching ends 172a', 174a' to their closed or outboardmost position.

Referring to FIGS. 11A and B, front and rear mounting assemblies 80', 82' are shown. In this embodiment, top plates 84', 100' include camming surfaces with a lip along which the ends 172a', 174a' of connecting rods 172', 174' will slide and engage with to retain the panels in the closed position. Specifically, top plate 84' includes an angled camming surface 230' with a lip 232' while top plate 100' includes two angled camming surfaces 234', 236' with respective lips 238', 240'.

Figure 12A:
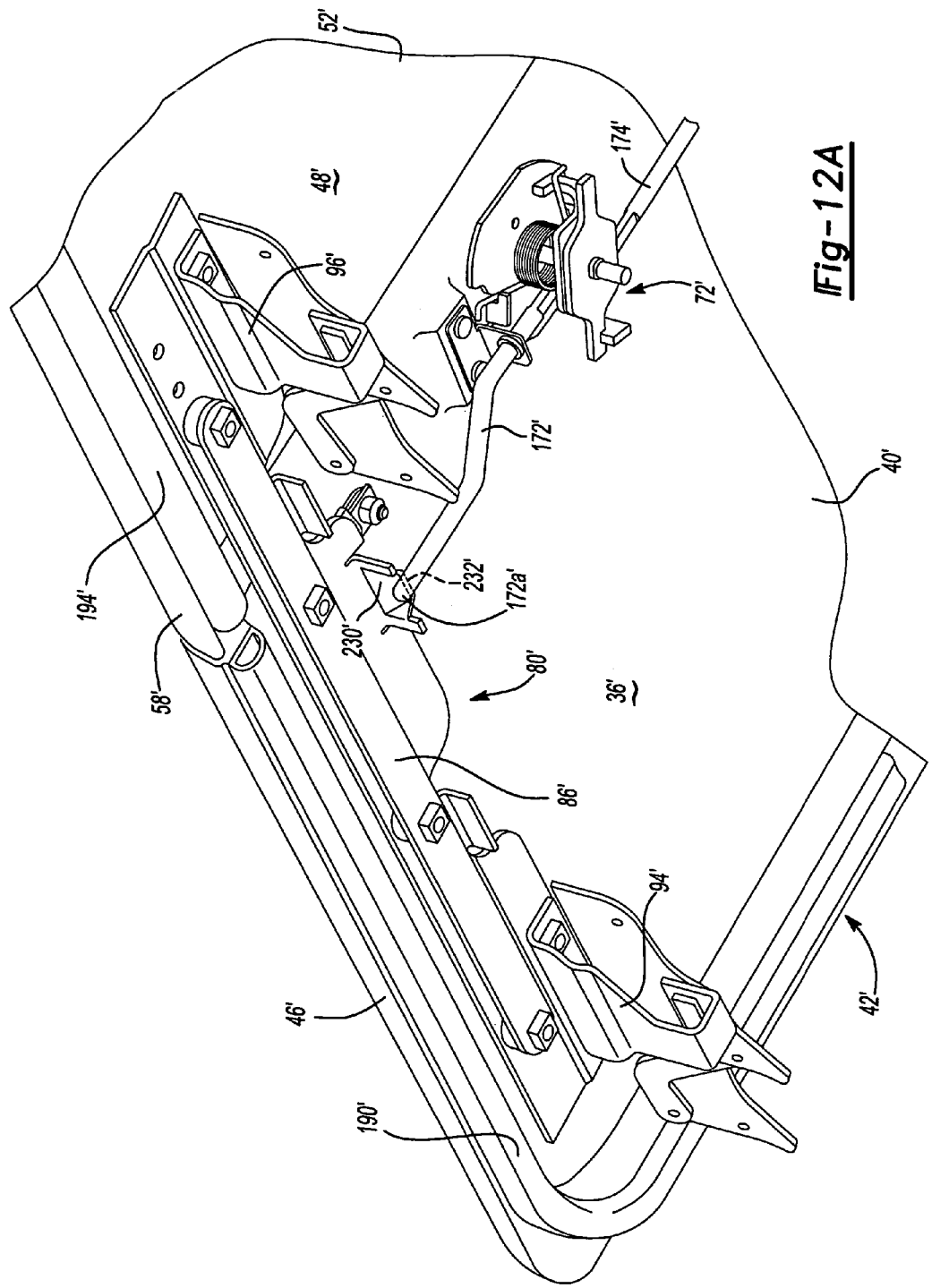
FIGS. 12A and B are fragmented perspective views of the interior surface of the tonneau panels according to the second preferred embodiment of the present invention in the closed position.
Figure 12B:
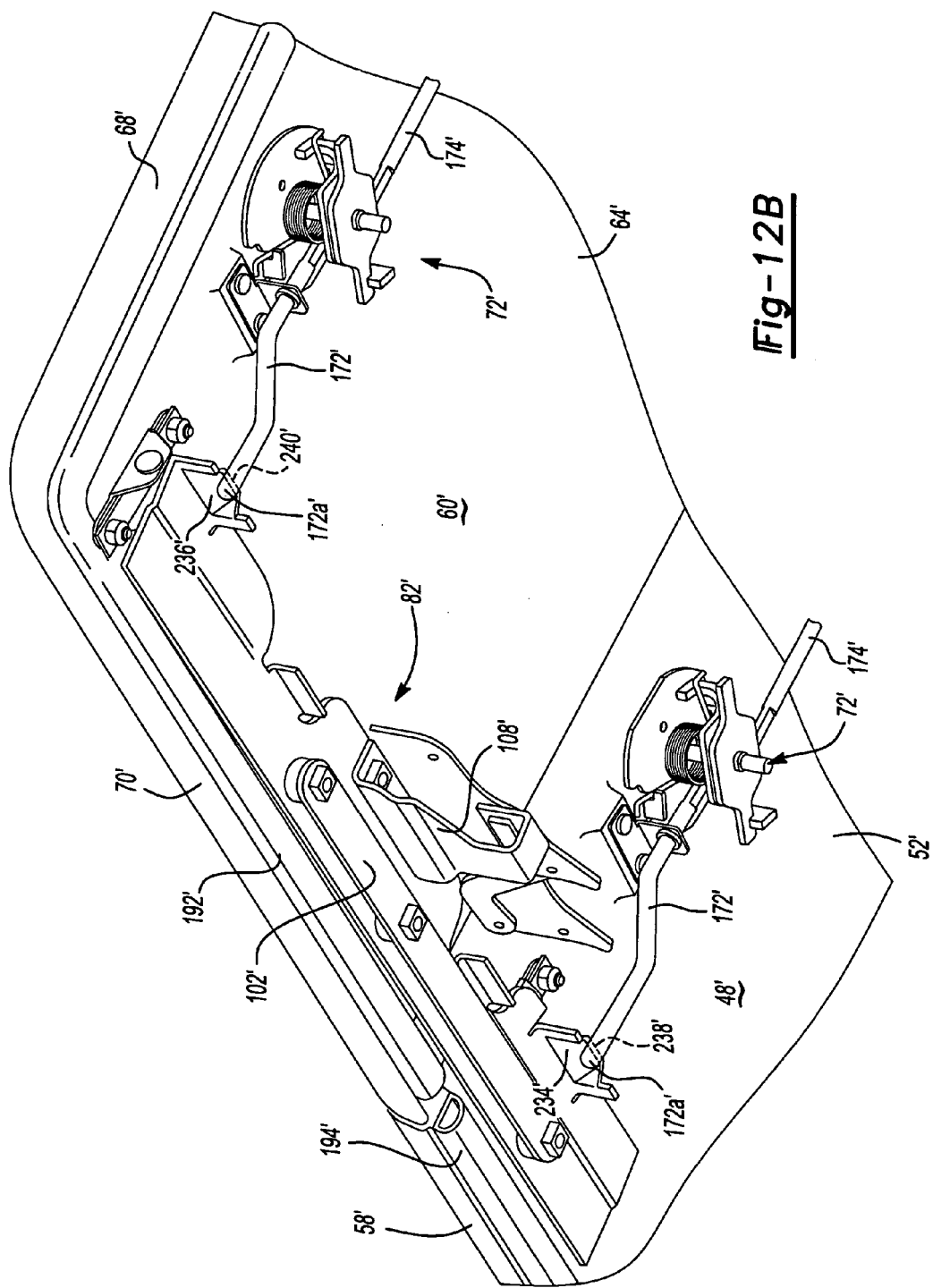
Figure 15:
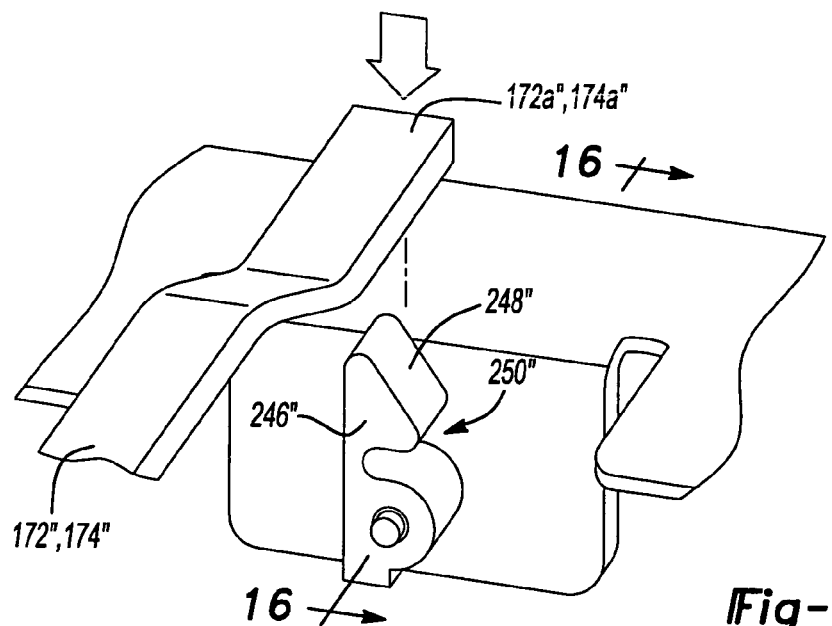
FIG. 15 is a fragmented perspective view of the first alternate embodiment of the present invention showing the latching member and latching ends used to retain the panels in the closed position.
Figure 16:
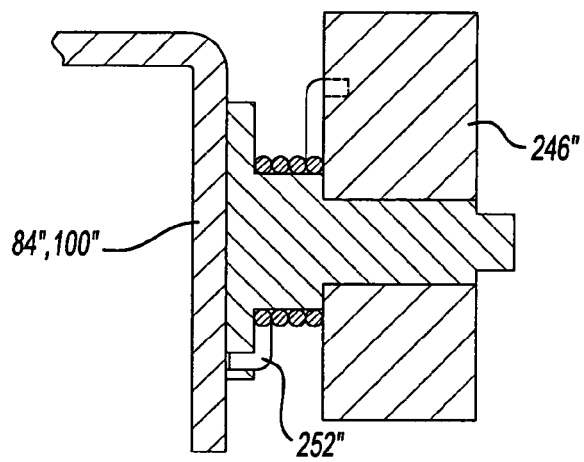
FIG. 16 is a cross-sectional view of the latching member of FIG. 15 along line 16—16.

Referring to FIGS. 12–13, when a tonneau panel is moved from an open position to a closed position, latching ends 172a', 174a' slide along one of the camming surfaces 230', 234', 236' and move inwardly (inboard) away from the side walls due to the allowed relative rotation of middle plate 158' relative to stationary plate 156'. Latching ends 172a', 174a' resist this movement due to the biasing of torsion spring 162'. When the panel has been closed a sufficient amount, as shown in solid lines in FIG. 13, latching ends 172a', 174a' on the respective connecting rods 172', 174' will pass below the lip 232', 238', 240' associated with the respective camming surface 230', 234', 236' and move outwardly toward the side walls of the truck bed beneath the lip of the camming surface, thereby securing the panel in the closed position. When it is desired to open the panel, handle 150' is rotated which in turn causes connecting rods 172', 174' to pull latching ends 172a', 174a' inwardly. With the latching ends 172a', 174a' pulled inwardly a sufficient distance, the lips of the camming surfaces disengage from the latching ends and the starter springs encourage the panel to pop open to a slightly ajar position. The panel can then be easily moved upwardly to its fully open position.

Referring now to FIGS. 14–17, a first alternate embodiment of the present invention is shown. In this alternate embodiment, a different latching arrangement is used to secure the panels in the closed position. Specifically, as shown in FIGS. 14A and B, top plates 84", 100" include latching members 246". Each latching member 246" includes an angled surface 248" and a channel 250". Latching members 246" are pivotally mounted to the top plates 84", 100". A torsion spring 252" biases latching member 246" to a generally vertical position. The biasing caused by spring 252" resists rotation of latching member 246" during the closure of the panels, as discussed below.

Figure 17:
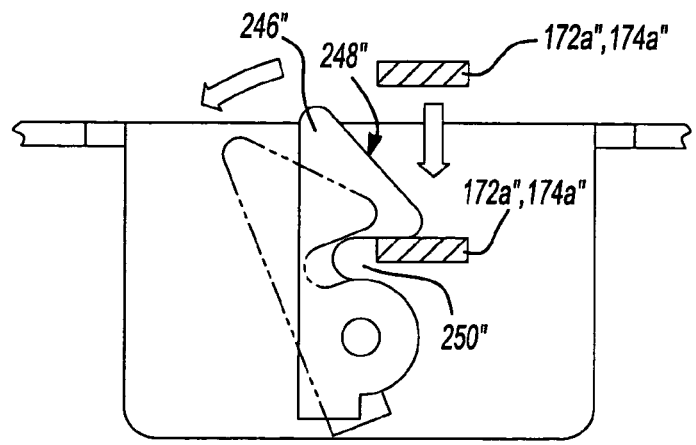
FIG. 17 is a side view showing the engagement between the latching end and the latching member according to the first alternate embodiment of the present invention.

In this alternate embodiment, the ends 172a", 174a" of connecting rods 172", 174" are flattened and generally rectangular in cross-section. The latching assembly is self-latching. Connecting rods 172", 174" are biased to their outboardmost position and are inwardly movable by rotation of the handle of the latching assembly. When a tonneau panel is moved from an open position to a closed position, latching ends 172a", 174a", as shown in FIG. 17, will engage with angled surfaces 248" of latching members 246" and cause latching members 246" to rotate against the biasing of springs 252", as shown in broken lines. When the panel has been closed a sufficient amount, latching members 246" will move back to their generally vertical position due to the biasing of springs 252". Latching ends 172a", 174a" are then retained within channels 250" of latching members 246" thereby securing the panel in the closed position. When it is desired to open the panel, the handle of the latching assembly is rotated which in turn causes connecting rods 172", 174" to pull latching ends 172a", 174a", inwardly. With latching ends 172a", 174a" pulled inwardly a sufficient distance, channels 250" of latching members 246" disengage from the latching ends and the starter spring encourages the panel to pop open to a slightly ajar position. The panel can then be easily moved upwardly to its fully opened position.

Latching members 246" can be configured to rotate forwardly or rearwardly in response to the closing of the panel. The direction of rotation of latching members 246" in response to the closing of the panels can play a factor in maintaining the panels in a closed position in the event of an impact or collision with the vehicle. For example, if the latches rotate forwardly in response to closing the panels and a rear impact is imparted upon the vehicle, the latches may operate to maintain the panels in their closed state. When the latching members 246" rotate rearwardly in response to closing the panels and the vehicle is impacted from behind, however, latching members 246" may move and release the panels from the latched position. If latching members 246" on opposing sides of the vehicle rotate in opposite directions, whether the vehicle is impacted from the front or the rear, at least one of the latches should operate to maintain the panel in a closed and secured state. Thus, the direction which latching members 246" rotate in response to closing the panels may effect the ability of latching members 246" to maintain the panels in the closed position in the event of a collision.

Figure 18:
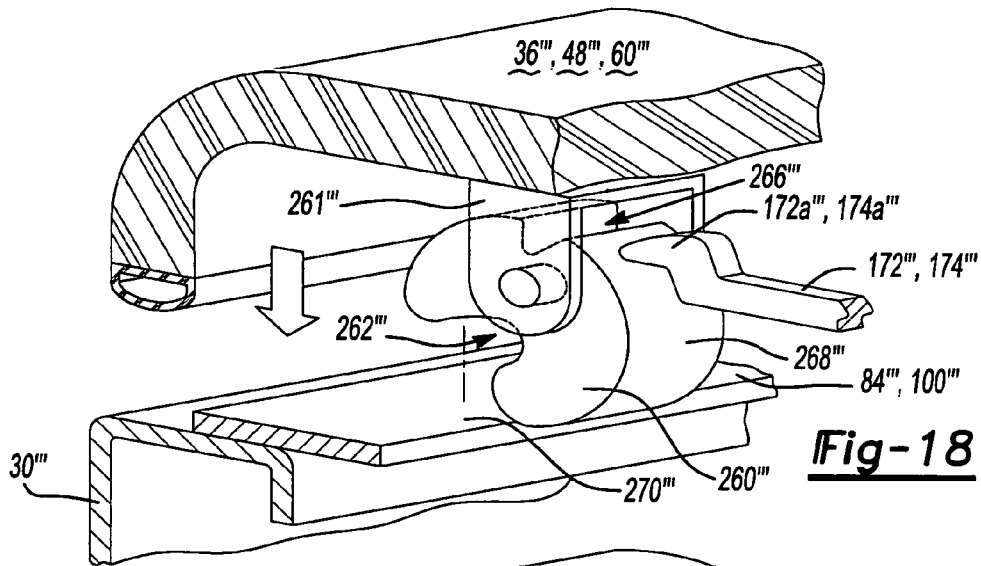
FIGS. 18 and 19 are fragmented cross-sectional perspective views of a second alternate embodiment of the present invention showing the latching arrangement in the released and engaged positions, respectively.
Figure 19:
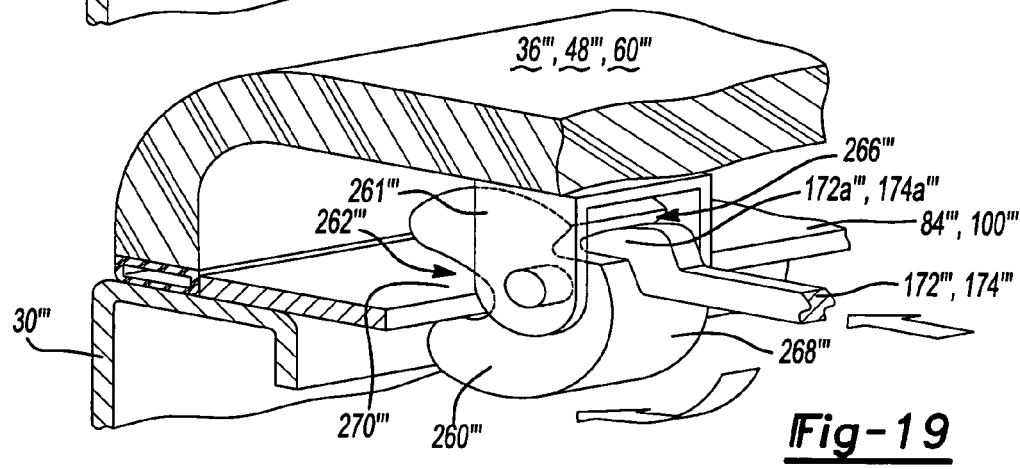
Figure 20:
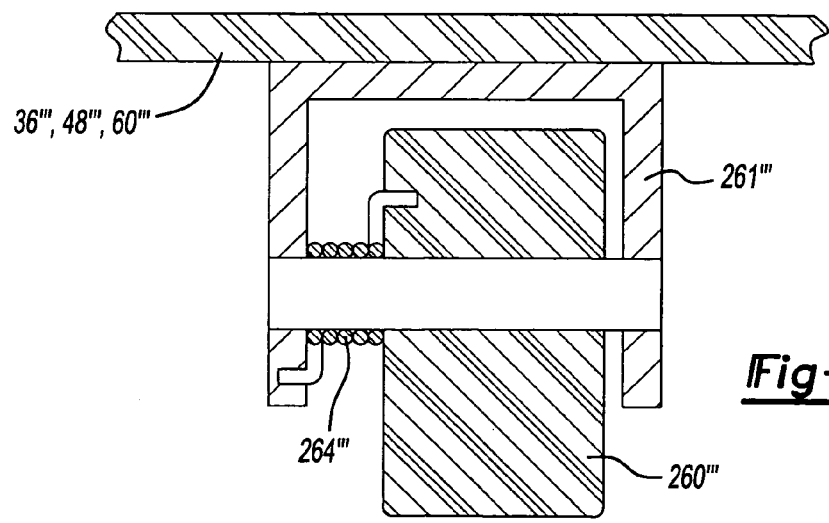
FIG. 20 is a cross-sectional view of the latching member according to the second alternate embodiment of the present invention.

Referring now to FIGS. 18–20, a second alternate embodiment is shown. In this embodiment, the latching of the panels in the closed position is significantly different. Each panel has a pair of latching members 260''' that are rotatably attached to the bottom or interior surfaces of each panel adjacent the side portions with a bracket 261'''. Latching members 260''' include a channel 262''' that is used to secure the panel in the closed position, as described in more detail below. Latching members 260''' are biased toward the open or released position by a torsion spring 264'''. Each latching member 260''' also has a recess 266''' in the exterior surface 268''' that engages with a component on the connecting rod to retain latching member 260''' in a closed position, as described in more detail below.

In this second alternate embodiment, ends 172a''', 174a''' are shaped into a finger or offset projection. The latching assembly is self-latching and ends 172a''', 174a''' are biased outwardly. Ends 172a''', 174a''' slide along surface 268''' and engage with recess 266''' of latching members 260''' to retain latching members 260''' in the latched position, as shown in FIG. 19.

Top plates 84''', 100''' are configured to have a substantially horizontal edge 270''' that engages with channel 262''' of latching member 260''' to secure the tonneau panel in the closed position. When a tonneau panel is moved from an open position to a closed position, edge 270''' engages with channel 262'''. As the tonneau panel continues to move toward the closed position, the engagement between edge 270''' and channel 262''' causes latching member 260''' to rotate inwardly against the bias of spring 264'''. Contemporaneously, latching ends 172a''', 174a''' slide along exterior surface 268''' of latching member 260'''. When the tonneau panel has been closed a sufficient amount, as shown in FIG. 19, edge 270''' is disposed between the two arms that define channel 262''' of latching member 260''' and latching ends 172a''', 174a''' are engaged in recess 266'''. The engagement between latching ends 172a''', 174a''' and recess 266''' prevents latching member 260''' from rotating outwardly due to the biasing of spring 264''', thereby securing the tonneau in the closed position. When it is desired to open the tonneau panel, the handle on the latch assembly is rotated which in turn causes latching ends 172a''', 174a''' to move inwardly and disengage from recess 266'''. This disengagement allows latching member 260''' to rotate outwardly due to the biasing of spring 264'''. The outward rotation of latching member 260''' encourages the panel to pop open to a slightly ajar position. The panel can then be easily moved upwardly to its fully open position. With the use of latching member 260''', the necessity for an initiator or starter spring may be eliminated.

In a third preferred embodiment of the present invention, the two-way acting seal is different while the remainder of the invention is substantially the same. As shown in FIG. 21, the two-way acting seal 196''' according to this embodiment includes a resilient metallic generally U-shaped lanced carrier or clip 280'''' embedded within lower portion 200''''. Clip 280'''', nubs 204'''' and projections 206'''' co-act to hold seal 196'''' to the extension of the tonneau panel. Also in this embodiment, projection 210'''' is made from a material having properties differing from the material used to make finger 212'''' and lower portion 200'''' that reflect the differing functionality of these components. Specifically, lower portion 200'''' and finger 212'''' are made from a more dense material, such as EPDM dense rubber with a Shore A rating of 50+/−5 while projection 210'''' is made from a less dense material, such as EPDM sponge rubber with a Shore A rating of 20+0/−10. The denser material is utilized due to the more static nature of lower portion 200'''' and finger 212'''' while the softer or less dense material is used for projection 210'''' due to the dynamic movement of this element and the necessity of projection 210'''' to form weather-tight seals between adjacent panels regardless of the sequence in which the adjacent panels are closed. The sealing between adjacent panels is substantially the same as that discussed above with reference to the first preferred embodiment.

In a fourth preferred embodiment of the present invention, the hinge assemblies 74''''', 76''''' are substantially the same as that disclosed above with reference to the first preferred embodiment with the addition of a gas assist spring 290''''' to assist with the opening of the panel. Additionally, gas assist spring 290''''' also helps retain the tonneau panel in the raised position until it is desired to close the panel. With this functionality, it may be possible to eliminate the locking member. One end 292''''' of gas assist spring 290''''' is pivotally coupled to mounting bracket 116''''' while an opposite end 294''''' is pivotally coupled to the tonneau panel. When the tonneau panel is moved from the closed position to the open position, gas assist spring 290''''' exerts an upward force on the tonneau panel to assist with the movement of the tonneau panel to the open position. The tonneau panel can then be left in the open position and gas assist spring 290''''' prevents the tonneau panel from inadvertently closing. When it is desired to close the tonneau panel, a force is exerted on the tonneau panel to overcome the force of gas assist spring 290''''' and the tonneau panel moves downwardly.

While various aspects of the preferred embodiment of tonneau cover 22 have been disclosed, it should be appreciated that other embodiments may be employed in combination with the present invention. For example, the configurations of the top and bottom surfaces and side walls of panels 36, 48, 60 may have differing shapes. The number of panels comprising tonneau cover 22 can be as little as two panels and greater than three panels. Additionally, the panels 36, 48, 60 can be made from other materials, such as polyurethane, thermoplastic, fiberglass, metal and the like. Moreover, while panels 36, 48, 60 are disclosed as being rigid panels, panels 36, 48, 60 can be soft or semi-rigid although all of the benefits of the present invention may not be realized. Further, it is envisioned that panels 36, 48, 60 can be adapted to extend longitudinally and/or opened in other directions although all the benefits of the present invention may not be realized. Additionally, tonneau cover 22 does not need to cover an entirety of truck bed 26 although all the benefits of the present invention may not be realized. Latch assembly 72 can employ other methods of moving catches 176 away from latching surfaces 98, 110, 112. Initiator 162 can be in a form other than a leaf spring. For example initiator 162 can be in the form of a coil spring or a resilient compressible material such as a foam or rubber member and still be within the scope of the present invention. Additionally, the configuration of mounting assemblies 80, 82 can deviate from that shown. Furthermore, while seals 190, 192 and 194 are shown and described as being generally D-shaped seals, other shapes for seals 190, 192 and 194 can be employed.

It is also envisioned that the various aspects of the present invention, such as latch assembly 72, hinge assemblies 74, 76 and prop 130, can be used with a tonneau cover in conjunction with a convertible roof system, such as that disclosed in U.S. Pat. No. 6,497,477 entitled "Convertible Hard Top for Vehicles," issued to Willard, the disclosure of which is incorporated by reference herein. Furthermore, it is also envisioned that the two-way acting seal 196 can be utilized to seal adjacent movable members together such as a rearmost roof bow or rearmost roof panel of a convertible roof system and a tonneau cover that covers the storage compartment within which the convertible roof resides when in a retracted position and/or between adjacent moveable roof panels, such as those disclosed in U.S. Pat. No. 6,419,308 entitled "Movable Roof System for an Automotive Vehicle" issued to Corder et al., and U.S. Pat. No. 6,485,094 entitled "Automotive Vehicle Open Air System" issued to Corder et al., the disclosures of which are incorporated herein by reference. Thus, while various materials and dimensions have been disclosed, other materials and dimensions can be readily used. It is intended by the following claims to cover these and any other departures from the disclosed embodiment which fall within the true spirit of this invention.

What is claimed is:

1. A tonneau cover for an automotive vehicle storage compartment opening having a pair of spaced apart longitudinally extending side members, the tonneau cover comprising at least three moveable panels extending transversely across a top of the opening, said panels enclosing an entirety of the opening, said panels being operable between open and closed positions independently of one another, and at least one transversely extending side portion of each of said panels extending transversely across said opening supported by said longitudinally extending side members and free of any support member extending transversely across said opening between said longitudinally extending side members.

2. The tonneau cover of claim 1, wherein said panels are rigid panels.

3. The tonneau cover of claim 1, wherein a rear portion of each of said panels opens upwardly.

4. The tonneau cover of claim 1, wherein said at least two panels comprises at least three panels.

5. The tonneau cover of claim 1, wherein each of said panels is a SMC material.

6. The tonneau cover of claim 1, wherein said panels reside above bed rails of the storage compartment, which is a truck bed, when said panels are in said closed position and said longitudinally extending side members are bed rails.

7. The tonneau cover of claim 1, wherein the storage compartment is a convertible top storage compartment.

8. A tonneau cover for an automotive vehicle comprising:
a plurality of panels covering at least a portion of a top opening of a truck bed of the automotive vehicle, said panels being operable between open and closed positions, at least two of said panels being adjacent one another with adjoining edges; and
a two-way acting seal between said adjoining edges of said adjacent panels, said two-way acting seal providing a weather-tight seal between said adjacent panels when closed regardless of a sequence in which said adjacent panels are closed, said two-way acting seal has a mounting portion that is attached to one of said adjoining edges, a first projection extending from said mounting portion that seals against one of said adjoining edges, and a second projection extending from said mounting portion that seals against the other of said adjoining edges.

9. The tonneau cover of claim 8, wherein said first projection has a first hardness, and said mounting portion has a second hardness different than said first hardness.

10. The tonneau cover of claim 9, wherein said second hardness is greater in magnitude than said first hardness.

11. The tonneau cover of claim 8, wherein said first projection has a first hardness and said second projection has a second hardness different than said first hardness.

12. The tonneau cover of claim 11, wherein said second hardness is greater in magnitude than said first hardness.

13. A tonneau cover for an automotive vehicle comprising:
a plurality of panels covering at least a portion of a top opening of a truck bed of the automotive vehicle, said panels being operable between open and closed positions, at least two of said panels being adjacent one another with adjoining edges; and
a two-way acting seal between said adjoining edges of said adjacent panels, said two-way acting seal providing a weather-tight seal between said adjacent panels when closed regardless of a sequence in which said adjacent panels are closed, said two-way acting seal has an upper portion with a first projection that seals against one of said adjoining edges and a second projection that seals against the other of said adjoining edges,
wherein said first projection seals against a generally vertical section of one of said adjoining edges when said adjacent panels are closed in a first sequence and said first projection seals against a generally horizontal section of said one adjoining edge when said adjacent panels are closed in a second sequence different than said first sequence.

14. The tonneau cover of claim 8, wherein said second projection seals against and said mounting portion is attached to a same adjoining edge and said first projection seals against the other of said adjoining edges.

15. The tonneau cover of claim 8, wherein said first projection is a bulbous projection.

16. The tonneau cover of claim 15, wherein said bulbous projection is hollow.

17. The tonneau cover of claim 8, wherein said portion includes a generally U-shaped channel and is attached to one of said adjoining edges.

18. The tonneau cover of claim 8, wherein said two-way acting seal includes a retaining clip operable to assist in maintaining said two-way acting seal attached to one of said adjoining edges.

19. A sealing system for an automotive vehicle compartment, the sealing system comprising:
a plurality of members covering at least a portion of a top opening of the compartment, said members being operable between open and closed positions, at least two of said members being adjacent one another with adjoining edges when in said closed position, and at least one of said members being substantially horizontal when in said closed position; and
a two-way acting seal between said adjoining edges of said adjacent members, said two-way acting seal providing a weather-tight seal between said adjacent members when closed regardless of a sequence in which said adjacent members are closed, said two-way acting seal has an upper portion with a first projection that seals against one of said adjoining edges, a second projection that seals against the other of said adjoining edges, and a lower portion that includes a generally U-shaped channel attached to one of said adjoining edges.

20. The sealing system of claim 19, wherein said second projection seals against and said lower portion is attached to a same adjoining edge and said first projection seals against the other of said adjoining edges.

21. The sealing system of claim 19, wherein said first projection is a bulbous projection.

22. The sealing system of claim 21, wherein said bulbous projection is hollow.

23. The sealing system of claim 19, wherein said first projection has a first hardness and said second projection has a second hardness different than said first hardness.

24. The sealing system of claim 23, wherein said second hardness is greater in magnitude than said first hardness.

25. The sealing system of claim 19, wherein said members are sunroof panels.

26. The sealing system of claim 19, wherein one of said members is a tonneau cover and another of said members is a roof bow of a convertible roof.

27. The sealing system of claim 19, wherein said two-way acting seal includes an internal retaining clip operable to assist in maintaining said two-way acting seal attached to one of said adjoining edges.

* * * * *

UNITED STATES PATENT AND TRADEMARK OFFICE
CERTIFICATE OF CORRECTION

PATENT NO. : 7,066,523 B2 Page 1 of 1
APPLICATION NO. : 10/868750
DATED : June 27, 2006
INVENTOR(S) : Anthony J. Verduci et al.

It is certified that error appears in the above-identified patent and that said Letters Patent is hereby corrected as shown below:

Column 11, line 42, "196'" " should be --196""--.

Column 14, line 18, Claim 17, after "said", insert --mounting--.

Signed and Sealed this

Third Day of April, 2007

JON W. DUDAS
*Director of the United States Patent and Trademark Office*